(12) United States Patent
Guo et al.

(10) Patent No.: US 12,490,277 B2
(45) Date of Patent: Dec. 2, 2025

(54) TRANSMISSION OF DOWNLINK FEEDBACK INFORMATION USING DOWNLINK CONTROL INFORMATION FORMAT 0_2

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 18/005,053

(22) PCT Filed: Sep. 30, 2020

(86) PCT No.: PCT/CN2020/119457
§ 371 (c)(1),
(2) Date: Jan. 10, 2023

(87) PCT Pub. No.: WO2022/067691
PCT Pub. Date: Apr. 7, 2022

(65) Prior Publication Data
US 2023/0345503 A1 Oct. 26, 2023

(51) Int. Cl.
*H04W 72/232* (2023.01)
*H04L 1/00* (2006.01)
*H04W 72/044* (2023.01)

(52) U.S. Cl.
CPC ......... *H04W 72/232* (2023.01); *H04L 1/0041* (2013.01); *H04L 1/0061* (2013.01); *H04L 1/0072* (2013.01); *H04W 72/0466* (2013.01)

(58) Field of Classification Search
CPC ............ H04W 72/232; H04W 72/0466; H04L 1/0041; H04L 1/0061; H04L 1/0072;
(Continued)

(56) References Cited

U.S. PATENT DOCUMENTS

2011/0271169 A1  11/2011  Pi
2018/0131482 A1*  5/2018  Zhou ................... H04L 27/2666
(Continued)

FOREIGN PATENT DOCUMENTS

| CN | 110535565 A | 12/2019 |
| WO | 2019137520 A1 | 7/2019 |
| WO | 2020022522 A1 | 1/2020 |

OTHER PUBLICATIONS

LG Electronics: "Remaining Issues of Configured Grant For NR-U", 3GPP TSG RAN WG1 #101, R1-2004016, 3rd Generation Partnership Project, Mobile Competence Centre, 650, Route Des Lucioles, F-06921 Sophia-Antipolis Cedex, France, vol. RAN WG1, No. e-Meeting May 25, 2020-Jun. 5, 2020, May 16, 2020, 6 Pages, XP052345396, Sections 2, 3.
(Continued)

*Primary Examiner* — Kiet Tang
(74) *Attorney, Agent, or Firm* — ArentFox Schiff LLP

(57) ABSTRACT

Apparatus, methods, and computer-readable media for transmission of downlink feedback information using downlink control information format 0_2 are disclosed herein. A user equipment (UE) may receive, from a base station on a first subband, a downlink control information (DCI) having a first predetermined DCI format or a second predetermined DCI format, in which the second predetermined DCI format has a length smaller than the first predetermined DCI format. The UE also may determine that the DCI indicates a downlink feedback information (DFI) based on one or more of an indication in the DCI or a first predetermined scram-
(Continued)

bling code associated with the DCI, when the DCI is received with the second predetermined DCI format.

30 Claims, 16 Drawing Sheets

(58) Field of Classification Search
CPC ..... H04L 1/1896; H04L 5/001; H04L 5/0048; H04L 5/0051; H04L 5/0055
See application file for complete search history.

(56) References Cited

U.S. PATENT DOCUMENTS

| | | | |
|---|---|---|---|
| 2019/0097756 A1 | 3/2019 | Chatterjee et al. | |
| 2019/0123875 A1* | 4/2019 | Guan | H04L 5/0053 |
| 2019/0222356 A1 | 7/2019 | Zhang et al. | |
| 2019/0274032 A1* | 9/2019 | Chatterjee | H04L 5/00 |
| 2020/0008270 A1 | 1/2020 | Zhang et al. | |
| 2020/0053779 A1* | 2/2020 | Jeon | H04W 74/02 |
| 2020/0084783 A1 | 3/2020 | Li et al. | |
| 2020/0092913 A1 | 3/2020 | Xu et al. | |
| 2020/0304230 A1 | 9/2020 | Papasakellariou | |
| 2021/0314102 A1* | 10/2021 | Li | H04L 1/1614 |

OTHER PUBLICATIONS

Supplementary European Search Report—EP20955716—Search Authority—Munich—May 24, 2024.

International Search Report and Written Opinion—PCT/CN2020/119457—ISA/EPO—Jun. 29, 2021.

LG Electronics: "Remaining Issues of Configured Grant for NR-U", 3GPP TSG RAN WG1 #101, R1-2004016, e-Meeting, May 25, 2020-Jun. 5, 2020, 6 Pages, Jun. 5, 2020 (Jun. 5, 2020), sections 1, 3-4.

Nokia, et al., "Remaining Issues on DL Signals and Channels", 3GPP TSG RAN WG1 Meeting #100e, R1-2000501, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Feb. 28, 2020, Feb. 14, 2020 (Feb. 14, 2020), XP051852898, 16 Pages, 5 Support of new URLLC DCI formats 0-2 & 1_2 for NR-U, Section 5.

Sharp: "Potential Enhancements for Unlicensed band URLLC/IIoT", 3GPP TSG RAN WG1#102-e, eMeeting, R1-2006574, Aug. 17, 2020-Aug. 28, 2020, pp. 1-4, Aug. 28, 2020 (Aug. 28, 2020), section 2.2.

* cited by examiner

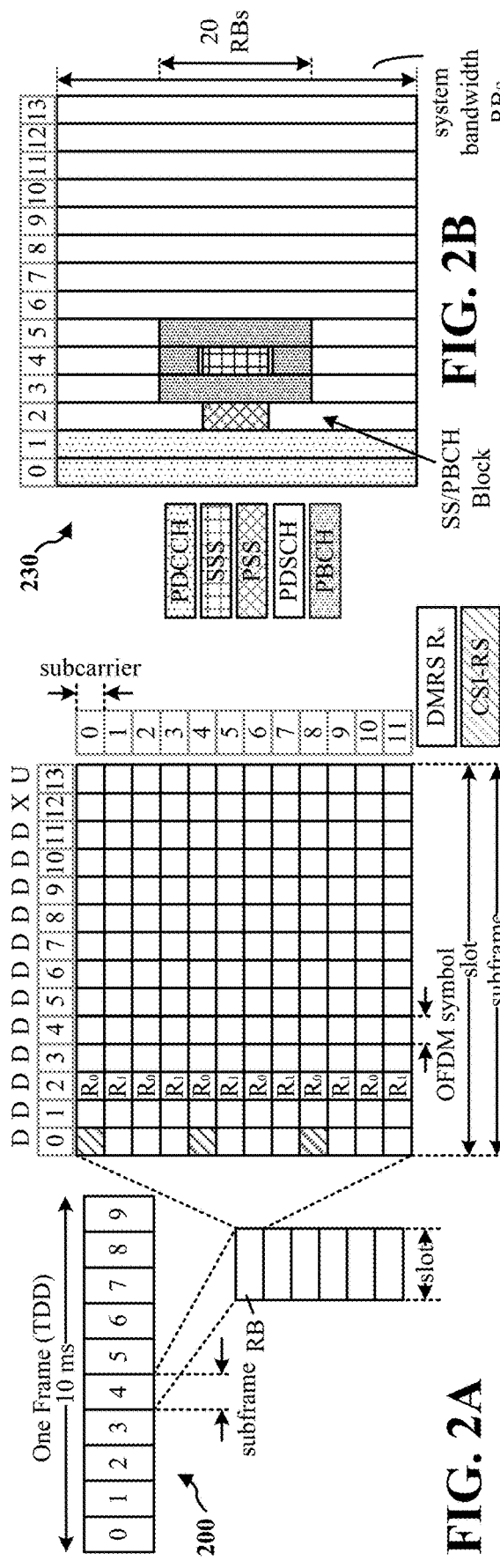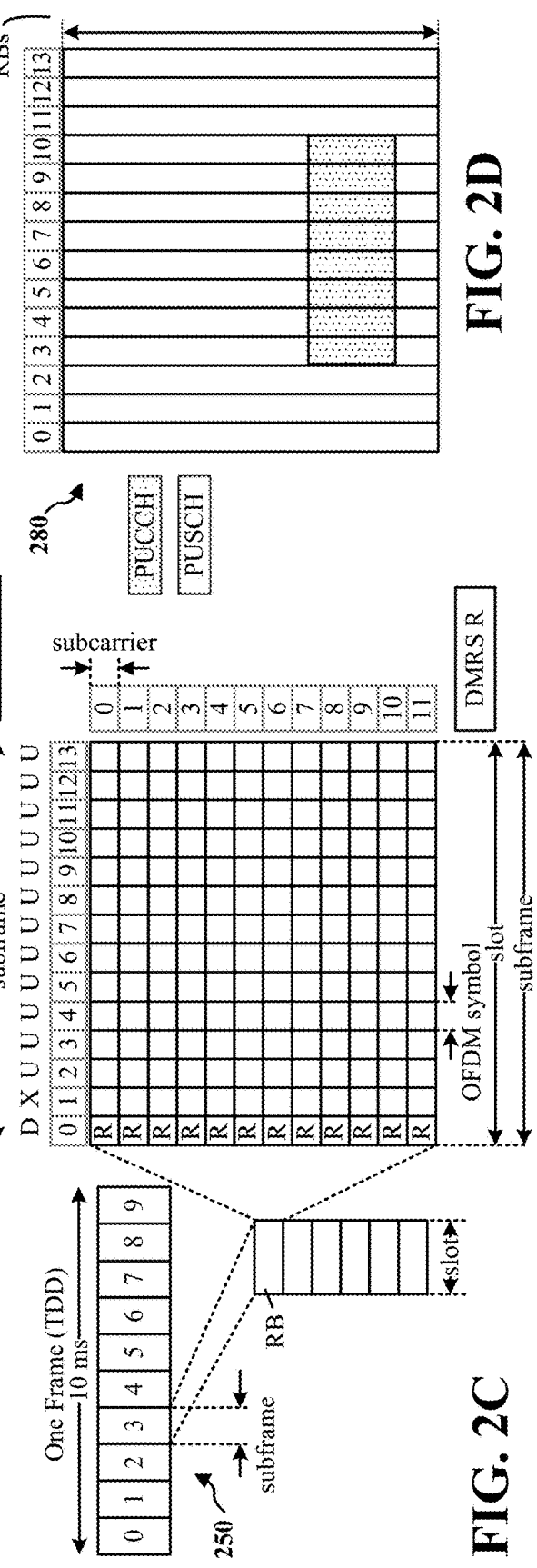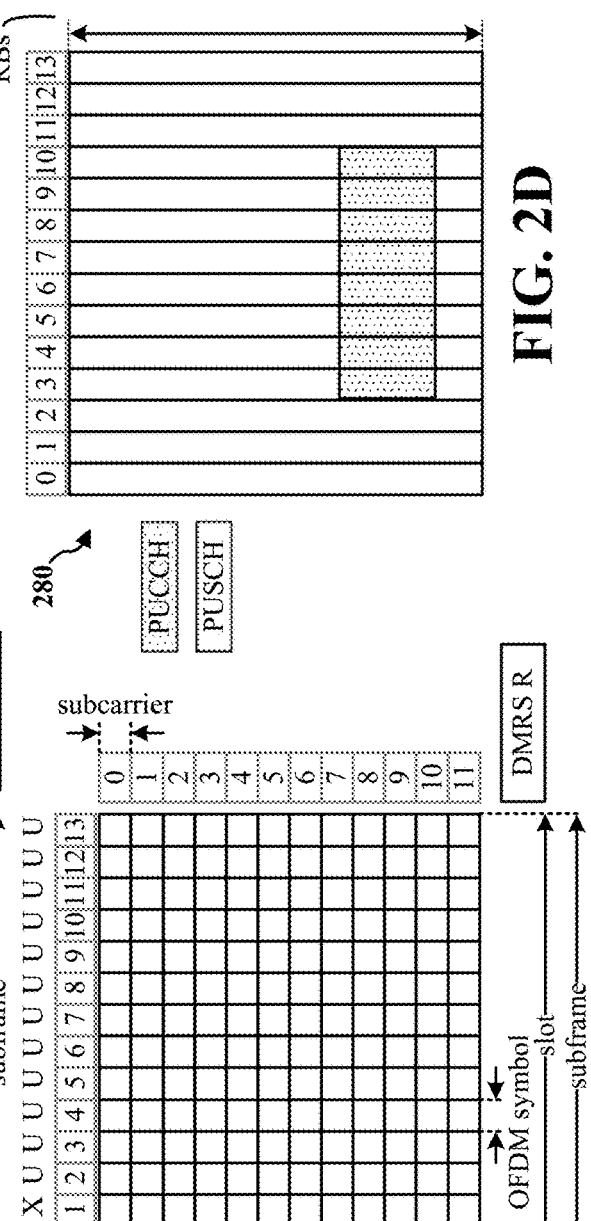

TRANSMISSION OF DOWNLINK FEEDBACK INFORMATION USING DOWNLINK CONTROL INFORMATION FORMAT 0_2

CROSS REFERENCE TO RELATED APPLICATION(S)

This application is a National Phase entry of PCT Application No. PCT/CN2020/119457, entitled "TRANSMISSION OF DOWNLINK FEEDBACK INFORMATION USING DOWNLINK CONTROL INFORMATION FORMAT 0_2" and filed on Sep. 30, 2020, which is expressly incorporated by reference herein in its entirety.

BACKGROUND

Technical Field

The present disclosure relates generally to communication systems, and more particularly, to transmission of downlink feedback information using downlink control information format 0_2.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the subject technology facilitates physical layer feedback enhancements that satisfy URLLC specifications that cover: (1) user equipment (UE) feedback enhancements for hybrid automatic repeat request acknowledgment (HARQ-ACK) technologies, and (2) channel state information (CSI) feedback enhancements to allow for more accurate modulation coding scheme (MCS) selection. In some aspects, the CSI feedback enhancements may include demodulation reference signal (DMRS)-based CSI feedback enhancements.

In some aspects, the subject technology also facilitates uplink enhancements for URLLC in unlicensed controlled environments by harmonizing uplink (UL) configured-grant enhancements in NR-Unlicensed (NR-U) and URLLC for unlicensed spectrum. The subject technology may specify support for UE-initiated channel occupancy time (COT) for frame based equipment (FBE) with minimum specification effort.

In some aspects, the subject technology also facilitates intra-UE multiplexing and prioritization of traffic with different priority by (1) specifying multiplexing behavior among HARQ-ACK/SR/CSI and PUSCH for traffic with different priorities, including cases with uplink channel information (UCI) on physical uplink control channel (PUCCH) and UCI on physical uplink shared channel (PUSCH), or (2) specifying physical layer (PHY) prioritization of overlapping dynamic grant PUSCH and configured grant (CG) PUSCH of different PHY priorities on a bandwidth part (BWP) of a serving cell including related cancelation behavior for the PUSCH of a lower PHY priority.

In some aspects, the subject technology also facilitates enhancements that support time synchronization. For example, the subject technology may include mechanisms that monitor for: (1) radio access network (RAN) impacts of service and system aspects WG2 (SA2) work on uplink time synchronization for time-sensitive network (TSN), if any, (2) propagation delay compensation enhancements, including mobility issues, if any, or (3) RAN enhancements based on new quality-of-service (QoS) related parameters if any (e.g. survival time, burst spread, decided in SA2).

In 5G NR systems that operate in unlicensed spectrum (e.g., NR-U), downlink feedback information (DFI) is introduced to address a symptom caused by a listen-before-talk (LBT) failure and DFI is transmitted using a downlink control information (DCI) format 0_1 frame structure with a cyclic redundancy check (CRC) scrambled by a scrambling code, such as a configured scheduling radio network temporary identifier (CS-RNTI). In URLLC systems, a compact DCI format 0_2 frame structure is introduced to provide an improved physical downlink control channel (PDCCH) reliability.

For URLLC to operate in NR-U, the DFI-based method can be reused to combat a LBT failure. However, DFI can only be transmitted using DCI format 0_1 with CRC scrambled by CS-RNTI, which has the following challenges: (1) an increase in UE blind detection complexity since the UE has to monitor both DCI formats 0_1 and 0_2 in order to use the DFI-based method, and (2) if the UE only supports monitoring for the DCI format 0_2, a CG DFI-based method may not be used. This may cause a decrease in CG DFI reliability compared with the compact DCI format 0_2 frame structure.

The present disclosure provides for the transmission of downlink feedback information with a DCI format 0_2 frame structure to address the LBT failure observed in NR-U operation while providing improved PDCCH reliability in URLLC operation. This can facilitate the harmonizing of UL CG enhancements in NR-U and URLLC for unlicensed spectrum.

In an aspect of the disclosure, a method, a computer-readable medium, and an apparatus are provided. The apparatus is configured to receive, from a base station on a first subband, a DCI having a first predetermined DCI format or a second predetermined DCI format, the second predetermined DCI format having a length smaller than the first predetermined DCI format. The apparatus is also configured to determine that the DCI indicates a DFI based on one or more of an indication in the DCI or a first predetermined scrambling code associated with the DCI, when the DCI is received with the second predetermined DCI format.

In an aspect of the disclosure, a method, a computer-readable medium, and an apparatus are provided. The apparatus is configured to generate a DCI having a first predetermined DCI format or a second predetermined DCI format, the second predetermined DCI format having a length smaller than the first predetermined DCI format. The apparatus is also configured to communicate, with a UE on a first subband, the DCI indicating a DFI based on one or more of an indication in the DCI or a first predetermined scrambling code associated with the DCI when the DCI is communicated with the second predetermined DCI format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
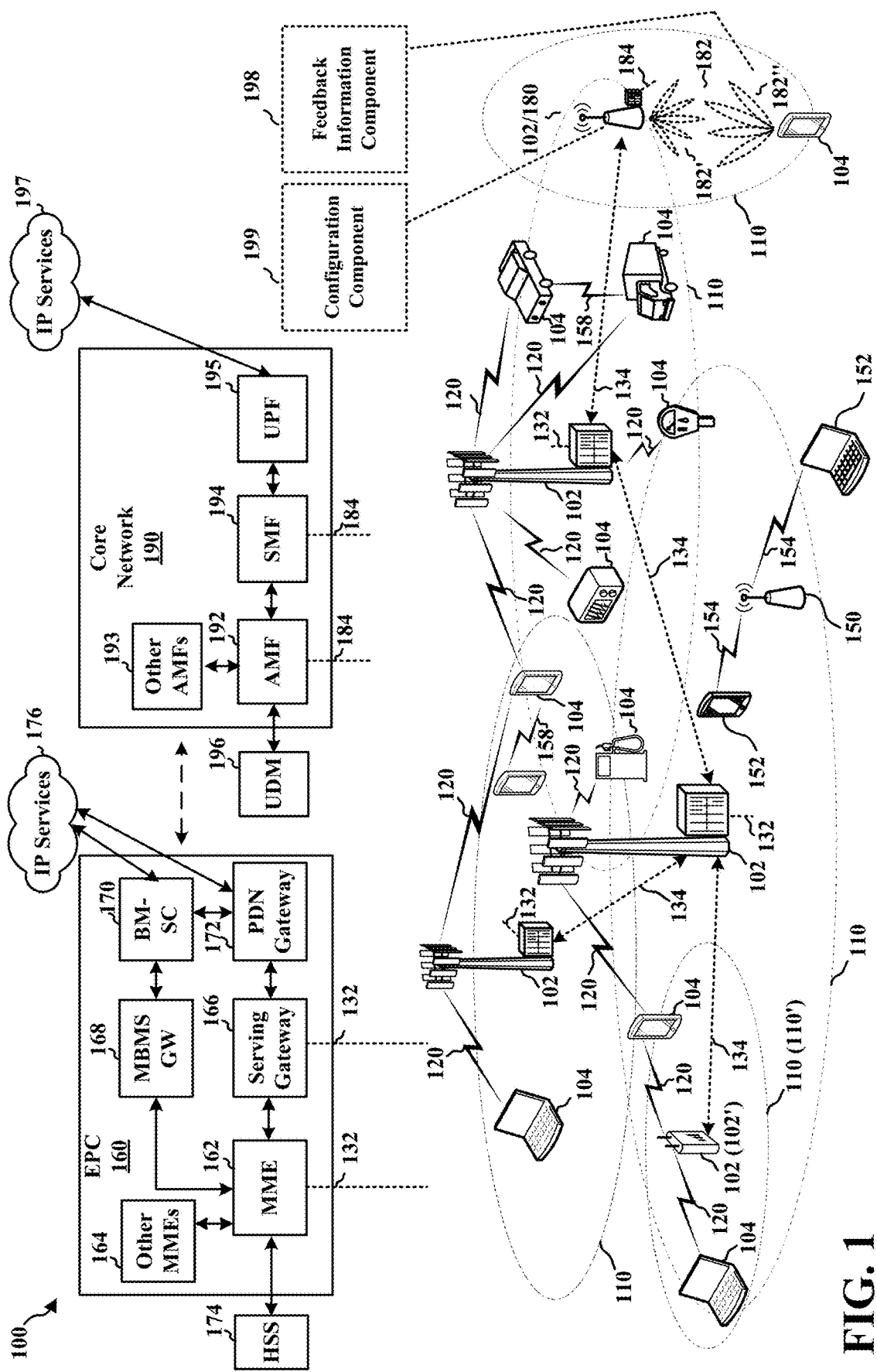
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a feedback information component 198 that is configured to receive, from the base station 102/180 on a first subband, a DCI having a first predetermined DCI format or a second predetermined DCI format, the second predetermined DCI format having a length smaller than the first predetermined DCI format. The feedback information component 198 is also configured to determine that the DCI indicates a DFI based on one or more of an indication in the DCI or a first predetermined scrambling code associated with the DCI, when the DCI is received with the second predetermined DCI format. Furthermore, in certain aspects, the base station 102/180 may include a configuration component 199 that is configured to generate a DCI having a first predetermined DCI format or a second predetermined DCI format, the second predetermined DCI format having a length smaller than the first predetermined DCI format. The configuration component 199 is also configured to communicate, with the UE 104 on a first subband, the DCI indicating a DFI based on one or more of an indication in the DCI or a first predetermined scrambling code associated with the DCI when the DCI is communicated with the second predetermined DCI format. Further related aspects and features are described in more detail in connection with FIGS. 4-16. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. In some aspects, the DCI carries DFI. The DFI may be used for handling the HARQ-ACK protocol in conjunction with a CG transmission in the uplink. The DFI may be transmitted using the PDCCH scrambled with CS-RNTI, such that no new physical channel is defined. Rather, the DCI format 0_1 frame structure is reused with a DFI flag indicating whether the remainder of the DCI is to be interpreted as an uplink scheduling grant or downlink feedback information. To distinguish usage of the DCI for activation/deactivation CG transmission and DFI, a 1 bit flag (serving as an explicit indication) is used, when type 1 and/or type 2 CG PUSCH is configured. If the DFI flag is set, the remainder of the DCI is interpreted as a bitmap to indicate positive or negative acknowledgment for each HARQ process contained within the DFI. The DFI size may be aligned with the UL grant DCI format 0_1 size. For example, reserved bits may be included to ensure the overall size of the DFI is equivalent to the DCI format 0_1 frame structure size regardless whether the DCI format 0_1 frame structure size carries an uplink grant or downlink feedback information, thus, the number of blind decoding attempts is not increased. In this regard, the UE blind decoding complexity is not increased due to matching sizes. In some aspects, the content of DFI includes: (1) a 1 bit UL/downlink (DL) flag, (2) a 0- or 3-bit carrier indicator field (CIF), 3 bits are used in the case of a cross carrier scheduled is configured, (3) the 1-bit DFI flag, used to distinguish between DCI format 0_1 based activation/deactivation and DFI, (4) 16-bit HARQ-ACK bitmap, (5) 2-bit transmit power control (TPC) command, and (6) any zero-padding to match the length of the DCI format 0_1 frame structure.

A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

The present disclosure provides for the transmission of downlink feedback information with a DCI format 0_2 frame structure to address the LBT failure observed in NR-U operation while providing improved PDCCH reliability in URLLC operation. This can facilitate the harmonizing of UL CG enhancements in NR-U and URLLC for unlicensed spectrum.

Figure 3:
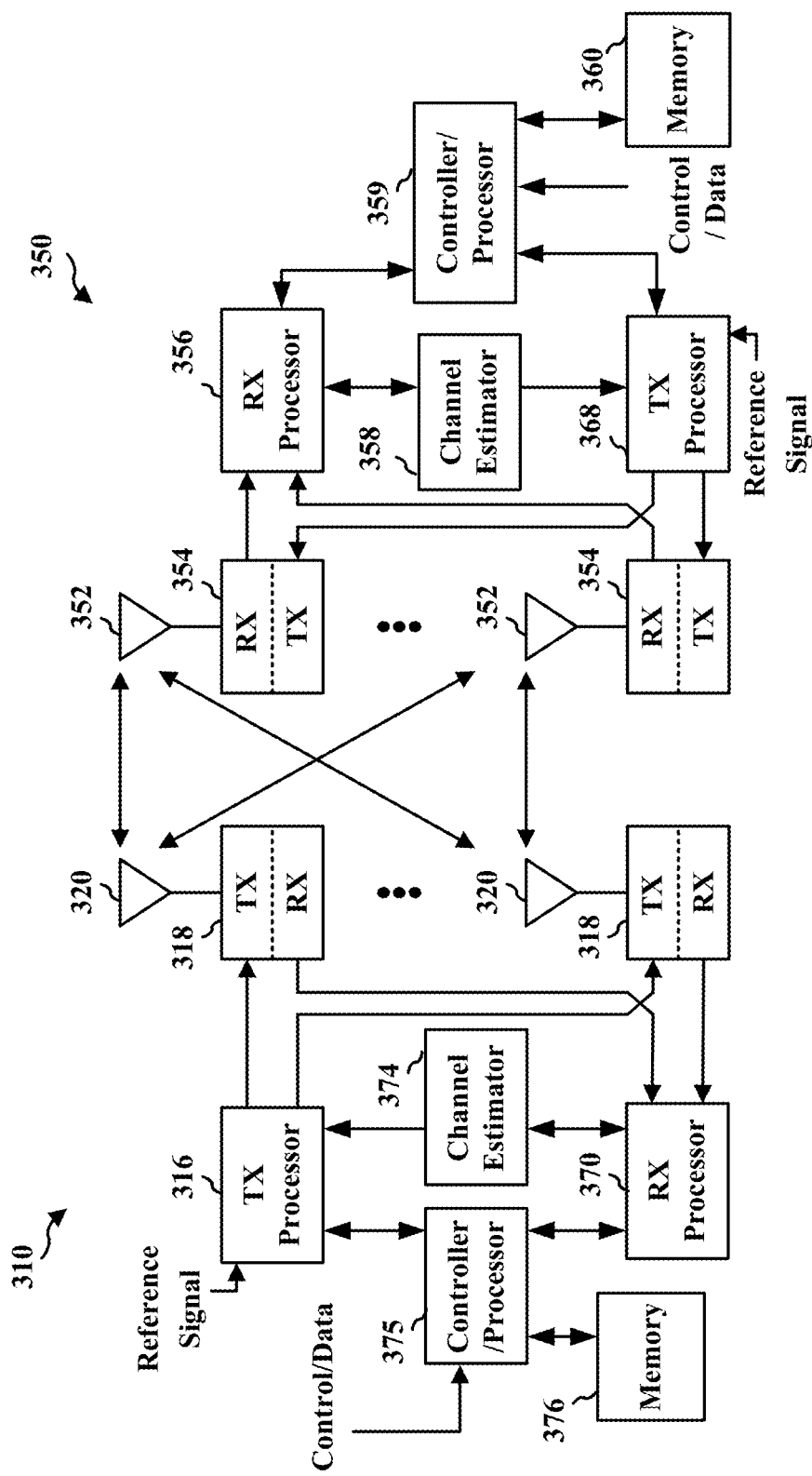
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the feedback component 198 of FIG. 1.

At least one of the TX processor 316, the RX processor 370, and the controller/processor 375 may be configured to perform aspects in connection with the configuration component 199 of FIG. 1.

Figure 4:
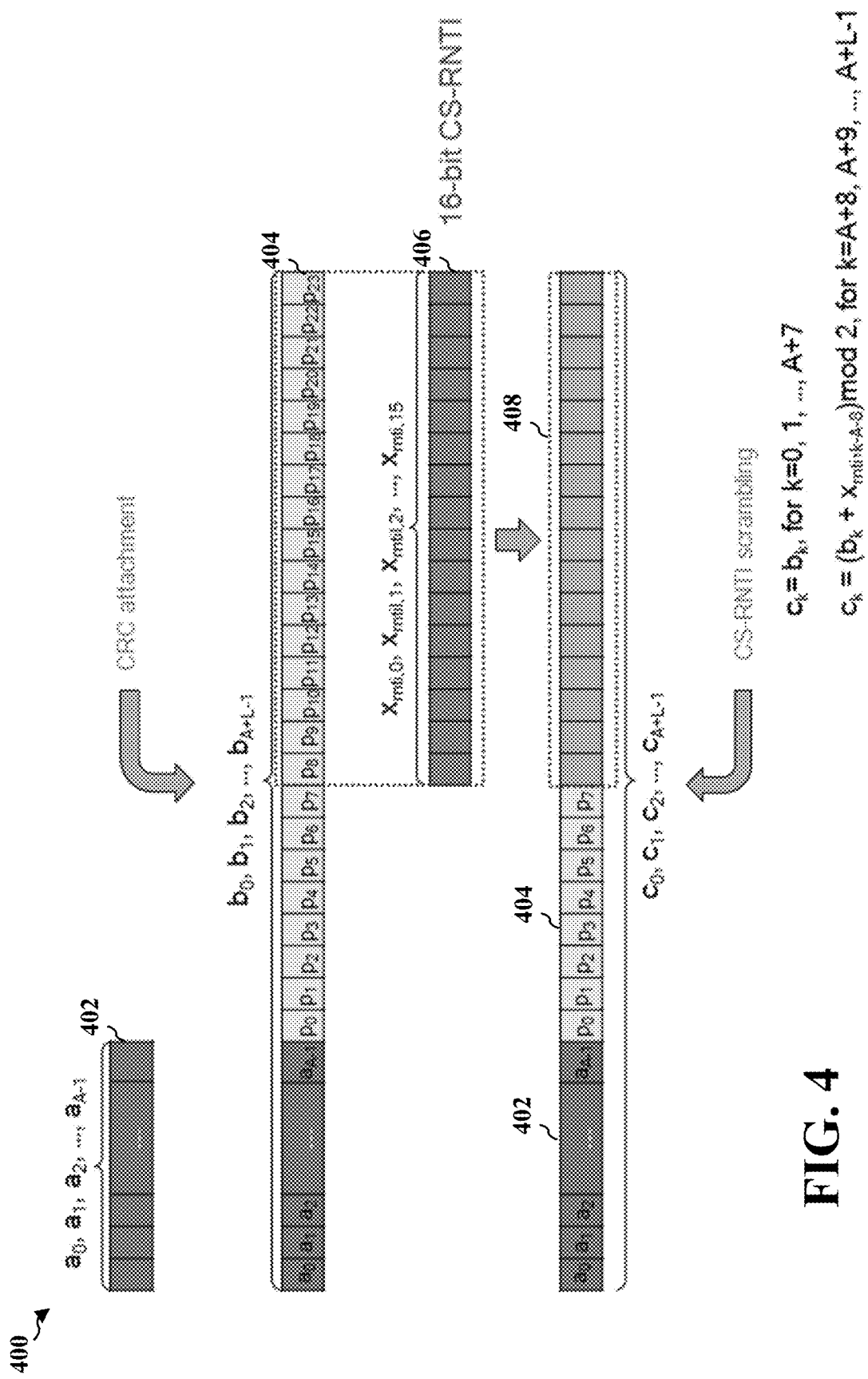
FIG. 4 is a diagram illustrating an example of a physical downlink control channel with a predetermined format encoded with a first scrambling code for indicating downlink feedback information in accordance with some aspects of the present disclosure.

FIG. 4 is a diagram illustrating an example of a physical downlink control channel 400 with a predetermined format encoded with a first scrambling code 406 for indicating downlink feedback information in accordance with some aspects of the present disclosure. In some aspects, the subject technology supports use of the DCI format 0_2 frame structure to indicate DFI to a UE. As illustrated in FIG. 4, a PDCCH 400 includes a DFI 402 and a CRC attachment 404. The generation of the PDCCH 400 includes generating a payload with inclusion of the DFI 402 (e.g., $a_0$, $a_1$, $a_2$, ..., $a_{A-1}$). The generation of the PDCCH 400 also includes appending the CRC attachment 404 (e.g., $b_0$, $b_1$, $b_2$, ..., $b_{A+L-1}$, where $b_k=a_k$, for k=0, 1, ..., A-1; $b_k=p_{k-A}$, for k=A, A+1, ..., A+L-1). In some aspects, the CRC attachment 404 has a length of 24 bits. The generation of the PDCCH 400 includes encoding at least a portion of the CRC attachment 404 with the first scrambling code 406 (e.g., $x_{rnti,0}$, $x_{rnti,1}$, $x_{rnti,2}$, ..., $x_{rnti,15}$), such as a 16-bit CS-RNTI. In some aspects, the PDCCH 400 is generated using the DCI format 0_2 frame structure with the CRC attachment 404 scrambled by CS-RNTI (e.g., $c_0$, $c_1$, $c_2$, ..., $c_{A+L-1}$, where $c_k=a_k$, for k=0, 1, ..., A+7; $c_k=(b_k+x_{rnti,k-A-8}) \mod 2$, for k=A+8, A+9, ..., A+L-1). In this regard, the generated PDCCH 400 includes the DFI 402, a portion of the CRC attachment 404 (unscrambled) and a scrambled CRC attachment portion 408. In various aspects, the PDCCH 400 is applied with a channel coding operation for transmission of the PDCCH 400. To distinguish the DCI format 0_2 frame structure for activation/deactivation CG transmission and DFI, a 1-bit flag (serving as explicit indication) is used, when type 1 and/or type 2 CG PUSCH is configured.

Figure 5:
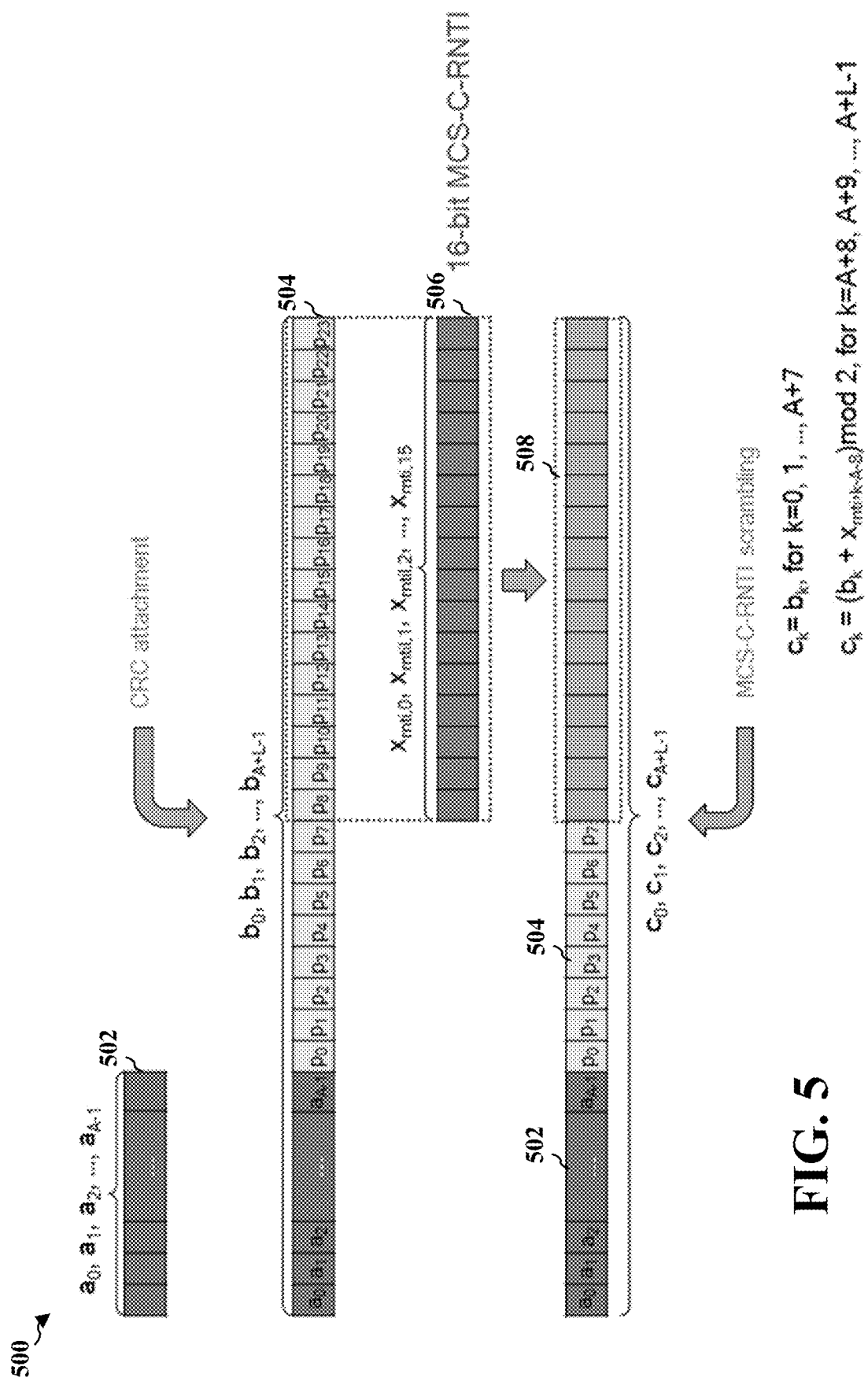
FIG. 5 is a diagram illustrating an example of a physical downlink control channel with a predetermined format encoded with a second scrambling code for indicating downlink feedback information in accordance with some aspects of the present disclosure.

FIG. 5 is a diagram illustrating an example of a physical downlink control channel with a predetermined format encoded with a second scrambling code for indicating downlink feedback information in accordance with some aspects of the present disclosure. In some aspects, the subject technology supports use of the DCI format 0_2 frame structure to indicate DFI to a UE. As illustrated in FIG. 5, a PDCCH 500 includes a DFI 502 and a CRC attachment 504. The generation of the PDCCH 500 includes generating a payload with inclusion of the DFI 502 (e.g., $a_0$, $a_1$, $a_2$, ..., $a_{A-1}$). The generation of the PDCCH 500 also includes appending the CRC attachment 504 (e.g., $b_0$, $b_1$, $b_2$, $b_{A+L-1}$, where $b_k=a_k$, for k=0, 1, ..., A-1; $b_k=p_{k-A}$, for k=A, A+1, ..., A+L-1). In some aspects, the CRC attachment 504 has a length of 24 bits. The generation of the PDCCH 500 includes encoding at least a portion of the CRC attachment 504 with the first scrambling code 506 (e.g., $x_{rnti,0}$, $x_{rnti,1}$, $x_{rnti,2}$, ..., $x_{rnti,15}$), such as a 16-bit modulation coding scheme cell radio network temporary identifier (MCS-C-RNTI). In some aspects, the PDCCH 500 is generated using the DCI format 0_2 frame structure with the CRC attachment 504 scrambled by MCS-C-RNTI (e.g., $c_0$, $c_1$, $c_2$, ..., $c_{A+L-1}$, where $c_k=a_k$, for k=0, 1, ..., A+7; $c_k=(b_k+x_{rnti,k-A-8}) \mod 2$, for k=A+8, A+9, ..., A+L-1). In this regard, the generated PDCCH 500 includes the DFI 502, a portion of the CRC attachment 504 (unscrambled) and a scrambled CRC attachment portion 508. In various aspects, the PDCCH 500 is applied with a channel coding operation for transmission of the PDCCH 500. To distinguish the DCI format 0_2 frame structure for activation/deactivation CG transmission and DFI, a 1-bit flag (serving as explicit indication) is used, when type 1 and/or type 2 CG PUSCH is configured.

Figure 6:
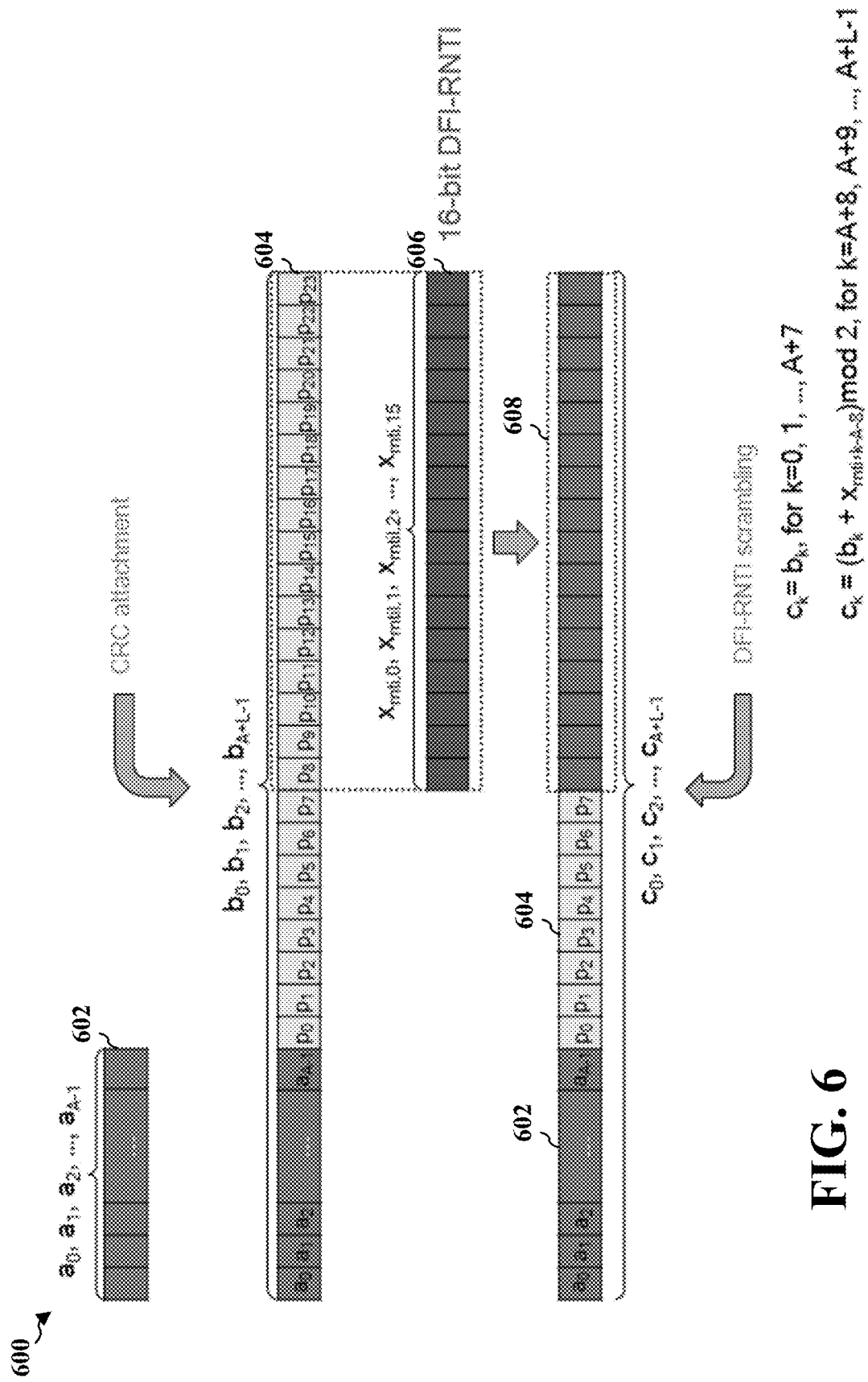
FIG. 6 is a diagram illustrating an example of a physical downlink control channel with a predetermined format encoded with a third scrambling code for indicating downlink feedback information in accordance with some aspects of the present disclosure.

FIG. 6 is a diagram illustrating an example of a physical downlink control channel with a predetermined format encoded with a third scrambling code for indicating downlink feedback information in accordance with some aspects of the present disclosure. In some aspects, the subject technology supports use of the DCI format 0_2 frame structure to indicate DFI to a UE. As illustrated in FIG. 6, a PDCCH 600 includes a DFI 602 and a CRC attachment 604. The generation of the PDCCH 600 includes generating a payload with inclusion of the DFI 602 (e.g., $a_0$, $a_1$, $a_2$, ..., $a_{A-1}$). The generation of the PDCCH 600 also includes appending the CRC attachment 604 (e.g., $b_0$, $b_1$, $b_2$, ..., $b_{A+L-1}$, where $b_k=a_k$, for k=0, 1, ..., A-1; $b_k=p_{k-A}$, for k=A, A+1, ..., A+L-1). In some aspects, the CRC attachment 604 has a length of 24 bits. The generation of the PDCCH 600 includes encoding at least a portion of the CRC attachment 604 with the first scrambling code 606 (e.g., $x_{rnti,0}$, $x_{rnti,1}$, $x_{rnti,2}$, ..., $x_{rnti,15}$), such as a 16-bit downlink feedback information radio network temporary identifier (DFI-RNTI). In some aspects, the PDCCH 600 is generated using the DCI format 0_2 frame structure with the CRC attachment 604 scrambled by DFI-RNTI (e.g., $c_0$, $c_1$, $c_2$, ..., $c_{A+L-1}$, where $c_k=a_k$, for k=0, 1, ..., A+7; $c_k=(b_k+x_{rnti,k-A-8}) \mod 2$, for k=A+8, A+9, ..., A+L-1). In this regard, the generated PDCCH 600 includes the DFI 602, a portion of the CRC attachment 604 (unscrambled) and a scrambled CRC attachment portion 608. In various aspects, the PDCCH 600 is applied with a channel coding operation for transmission of the PDCCH 600. To distinguish the DCI format 0_2 frame structure for activation/deactivation CG transmission and DFI, a different RNTI (e.g., DFI-RNTI) is used, when type 1 and/or type 2 CG PUSCH is configured.

Figure 7:
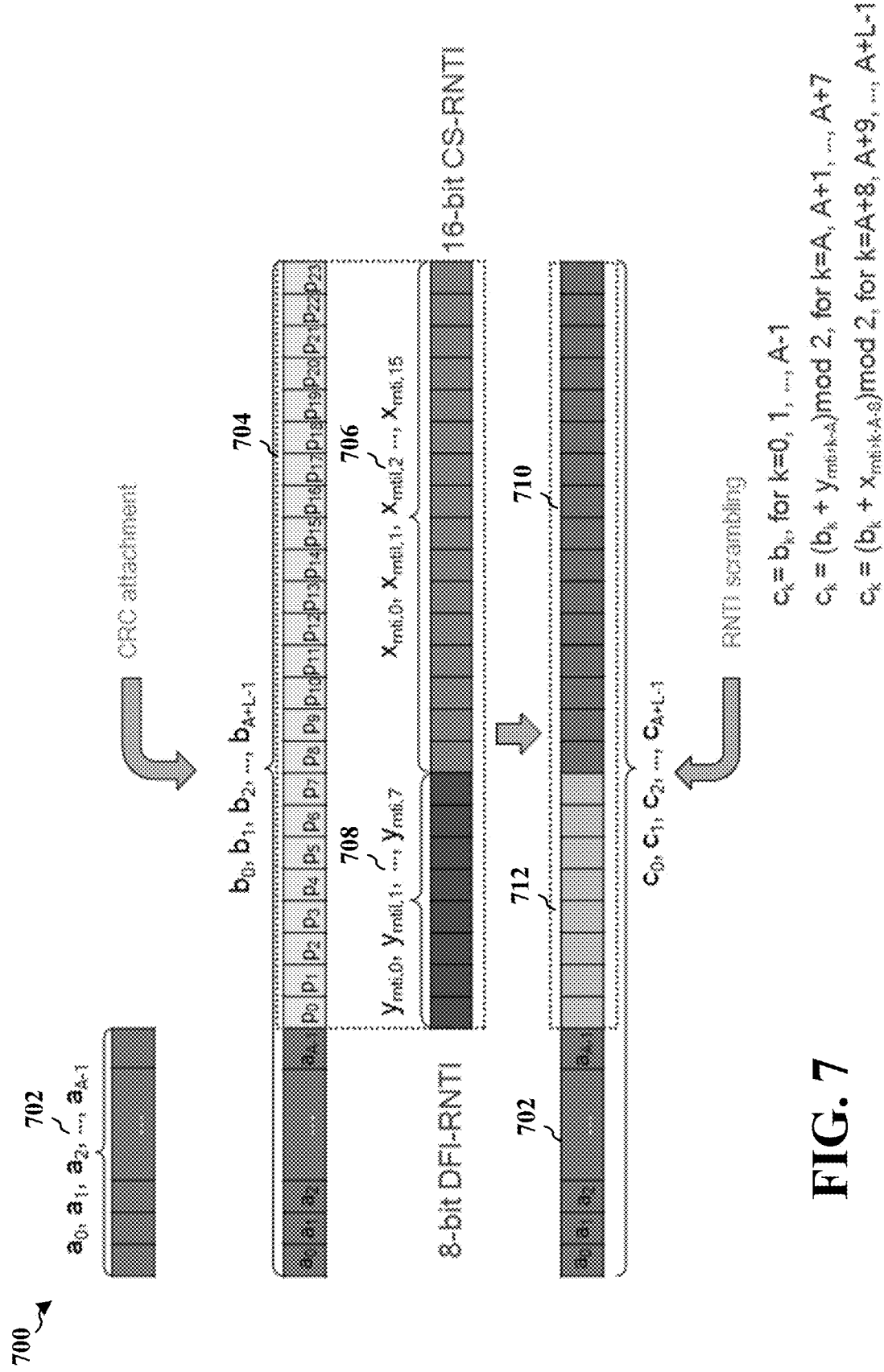
FIG. 7 is a diagram illustrating an example of a physical downlink control channel with a predetermined format encoded with a fourth scrambling code for indicating downlink feedback information in accordance with some aspects of the present disclosure.

FIG. 7 is a diagram illustrating an example of a physical downlink control channel with a predetermined format encoded with a fourth scrambling code for indicating downlink feedback information in accordance with some aspects of the present disclosure. In some aspects, the subject technology supports use of the DCI format 0_2 frame structure to indicate DFI to a UE. As illustrated in FIG. 7, a PDCCH 700 includes a DFI 702 and a CRC attachment 704. The generation of the PDCCH 700 also includes appending the CRC attachment 704 (e.g., $b_0, b_1, b_2, \ldots, b_{A+L-1}$, where $b_k=a_k$, for $k=0, 1, \ldots, A-1$; $b_k=p_{k-A}$, for $k=A, A+1, \ldots, A+L-1$). In some aspects, the CRC attachment 704 has a length of 24 bits. The generation of the PDCCH 700 includes encoding a first portion of the CRC attachment 704 with a first scrambling code 706 (e.g., $x_{rnti,0}, x_{rnti,1}, x_{rnti,2}, \ldots, x_{rnti,15}$), such as a 16-bit CS-RNTI. The generation of the PDCCH 700 also includes encoding a second portion of the CRC attachment 704 with a second scrambling code 708 (e.g., $y_{rnti,0}, y_{rnti,1}, y_{rnti,2}, \ldots, y_{rnti,7}$), such as an 8-bit DFI-RNTI. In some aspects, the PDCCH 700 is generated using the DCI format 0_2 frame structure with the CRC attachment 704 scrambled by DFI-RNTI and CS-RNTI (e.g., $c_0, c_1, c_2, \ldots, c_{A+L-1}$, where $c_k=b_k$, for $k=0, 1, \ldots, A-1$; $c_k=(b_k+y_{rnti,k-A-8}) \bmod 2$, for $k=A, A+1, \ldots, A+7$; $c_k=(b_k+x_{rnti,k-A-8}) \bmod 2$, for $k=A+8, A+9, \ldots, A+L-1$). In this regard, the generated PDCCH 700 includes the DFI 702, a first scrambled portion 710 of the CRC attachment 704 and a second scrambled portion 712 of the CRC attachment 704. As illustrated in FIG. 7, the second scrambled portion 712 with the 8-bit DFI-RNTI precedes the first scrambled portion 710 with the 16-bit CS-RNTI. In one or more implementations, the first scrambled portion 710 with the 16-bit CS-RNTI may precede the second scrambled portion 712 with the 8-bit DFI-RNTI (or the second scrambled portion 712 with the 8-bit DFI-RNTI may follow the first scrambled portion 710 with the 16-bit CS-RNTI). In various aspects, the PDCCH 700 is applied with a channel coding operation for transmission of the PDCCH 700. To distinguish the DCI format 0_2 frame structure for activation/deactivation CG transmission and DFI, a different RNTI (e.g., DFI-RNTI) is used, when type 1 and/or type 2 CG PUSCH is configured.

Figure 8:
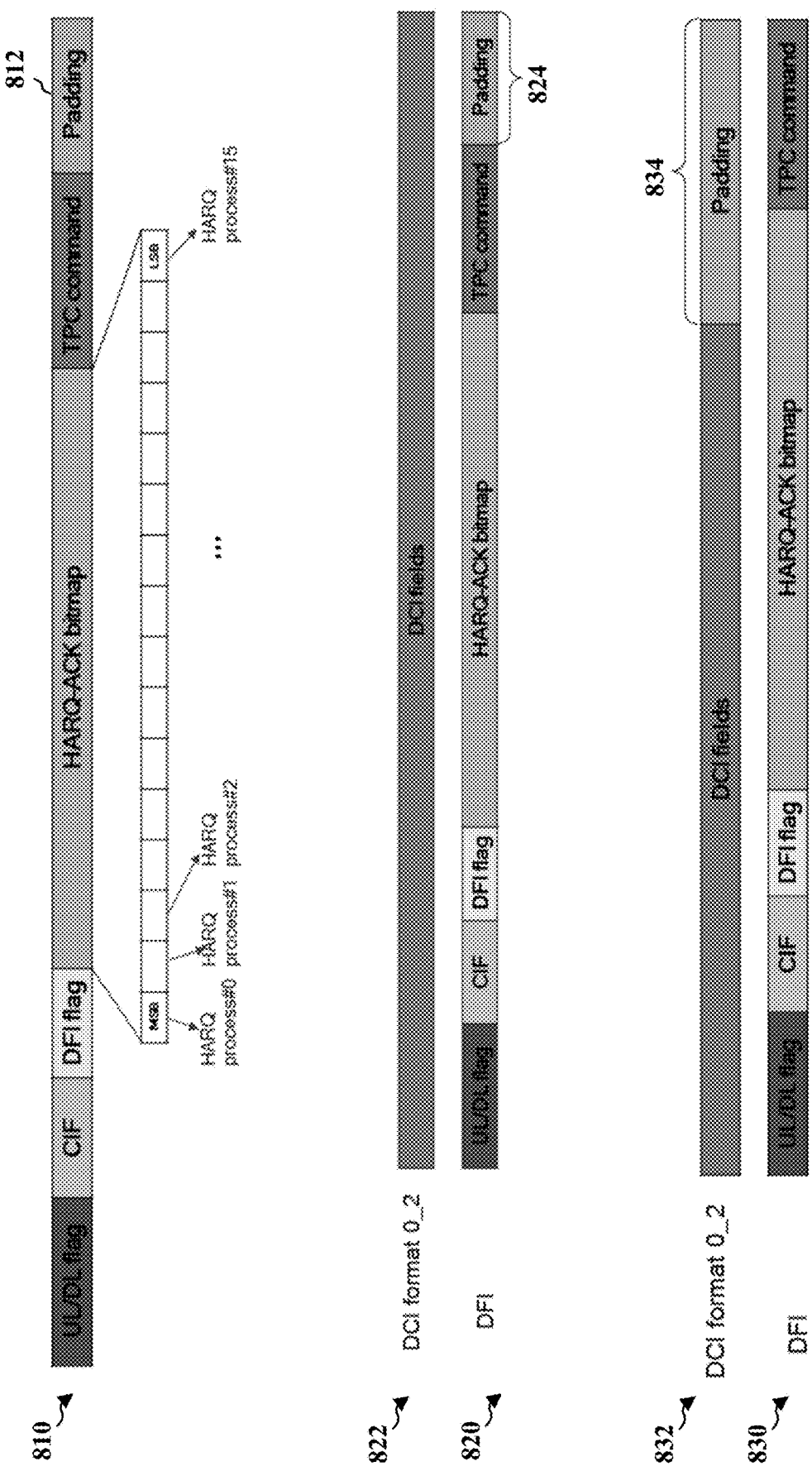
FIG. 8 is a diagram illustrating examples of downlink feedback information frame structures compared with a downlink control information format 0_2 frame structure in accordance with some aspects of the present disclosure.

FIG. 8 is a diagram illustrating examples of downlink feedback information frame structures compared with a downlink control information format 0_2 frame structure in accordance with some aspects of the present disclosure. In FIG. 8, a downlink feedback information frame structure 810 includes DFI content in the DCI format 0_2 frame structure. In various aspects, the downlink feedback information frame structure 810 in the DCI format 0_2 frame structure has DFI content that may include the following: (1) a 1-bit UL/DL flag, (2) 0- or 3-bit CIF, where 3 bits are used in the case of cross carrier scheduled is configured; 0 bit, otherwise, (3) 0-bit or 1-bit DFI flag, where 1 bit is used if the DFI frame structure as described in FIGS. 4 and 5 is used, or 0 bit is used if the DFI frame structure as described in FIGS. 6 and 7 is used, (4) 16-bit HARQ-ACK bitmap, (5) 2-bit transmit power control (TPC) command, and (6) any zero-padding to match the length of the DCI format 0_2 frame structure, if any.

In some implementations, if the CRC attachment (e.g., 404) is scrambled by CS-RNTI for DFI, the DFI flag bit value may be set to 0 to indicate activation of type 2 CG transmission or the DFI flag bit value may be set to 1 to indicate CG-DFI. In other implementations, for a DCI format 0_2 frame structure with the CRC attachment scrambled by cell RNTI (C-RNTI)/semi-persistent channel state information RNTI (SP-CSI-RNTI)/MCS-C-RNTI and for operation in a cell with shared spectrum channel access, the DFI flag is reserved. In some implementations, if the CRC attachment (e.g., 504) is scrambled by MCS-C-RNTI for DFI, the DFI flag bit value may be set to 0 to indicate UL scheduling or the DFI flag bit value may be set to 1 to indicate CG-DFI. In other implementations, for a DCI format 0_2 frame structure with the CRC attachment scrambled by C-RNTI/SP-CSI-RNTI/CS-RNTI and for operation in a cell with shared spectrum channel access, the DFI flag is reserved.

In some aspects, the HARQ-ACK field includes a bitmap field. The bitmap field may have a length of 16 bits. The order of the bitmap field may be set by HARQ process index mapping such that HARQ process indices are mapped in ascending order from most-significant bit (MSB) to least-significant bit (LSB) of the bitmap field. For each bit of the bitmap field, a bit value 1 indicates acknowledgment (ACK), and a bit value 0 indicates a negative ACK (NACK). In some aspects, the TPC command field has a length of 2 bits. All remaining bits of the DFI frame structure, if any, may be appended with padding bits 812 (e.g., each padding bit set to zero) to match the length of the DCI format 0_2 frame structure.

Also in FIG. 8, a downlink feedback information frame structure 820 has a DFI size that is aligned with the size of an UL grant DCI format 0_2 822 so that UE blind decoding complexity is not increased due to matching size. If the downlink feedback information frame structure 820 has a DFI size that is less than the UL grant DCI format 0_2 822 size, padding bits 824 (e.g., each padding bit set to zero) may be appended to the tail-end of the downlink feedback information frame structure 820 until the DFI size is equivalent to that of the UL grant DCI format 0_2 822.

Also in FIG. 8, a downlink feedback information frame structure 830 has a DFI size that is aligned with the size of an UL grant DCI format 0_2 832. If the downlink feedback information frame structure 830 has a DFI size that is greater than the UL grant DCI format 0_2 832 size (or if the UL grant DCI format 0_2 832 size is less than the DFI size of the downlink feedback information frame structure 830), padding bits 834 (e.g., each padding bit set to zero) may be appended to the tail-end of the downlink feedback information frame structure 830 until the UL grant DCI format 0_2 832 size is equivalent to that of the downlink feedback information frame structure 830.

Figure 9:
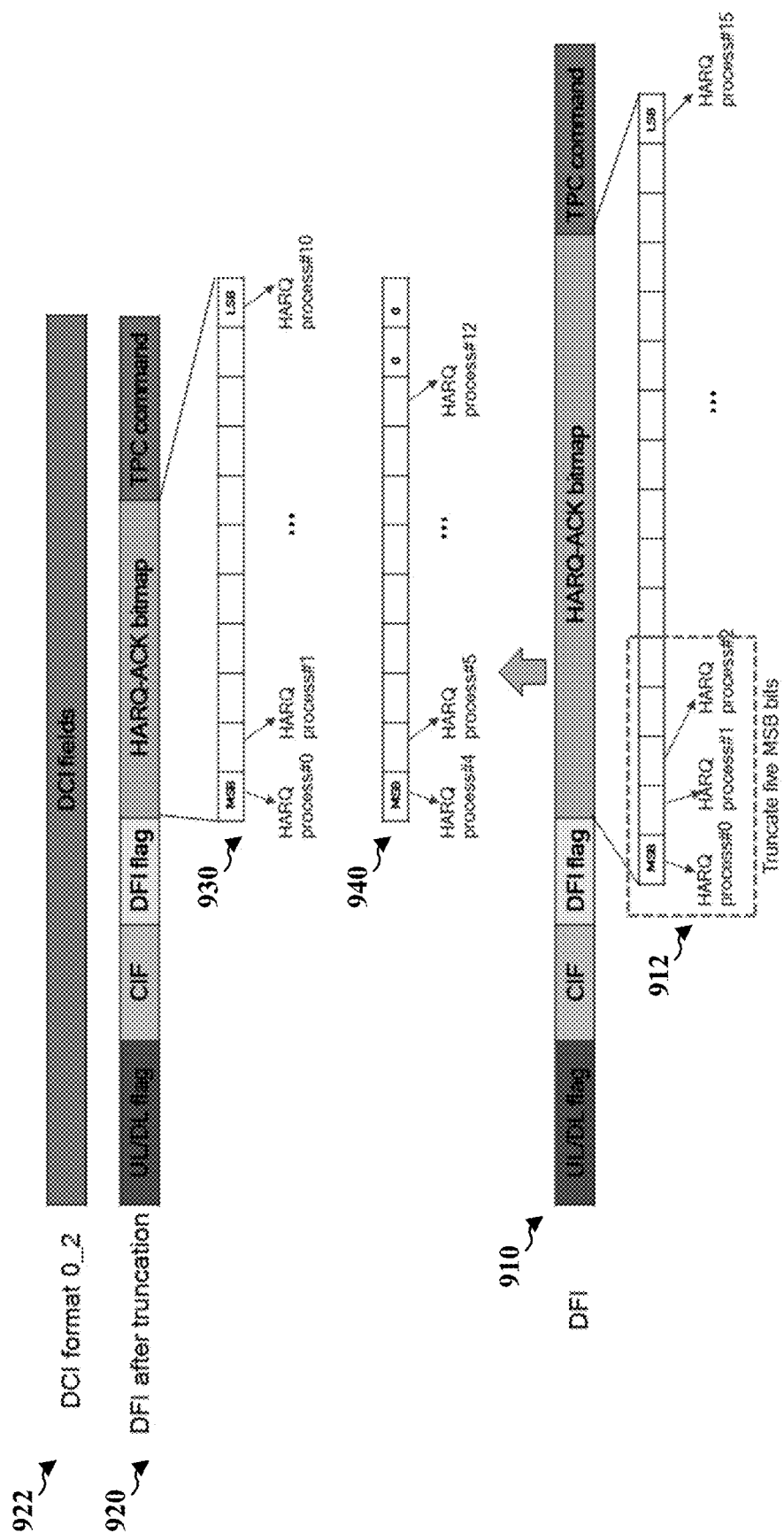
FIG. 9 is a diagram illustrating an example of downlink feedback information frame structure modification for corresponding to a downlink control information format 0_2 frame structure in accordance with some aspects of the present disclosure.

FIG. 9 is a diagram illustrating an example of downlink feedback information frame structure modification for corresponding to a downlink control information format 0_2 frame structure in accordance with some aspects of the present disclosure. In FIG. 9, a downlink feedback information frame structure 910 includes DFI content in the DCI format 0_2 frame structure. The downlink feedback information frame structure 910 has a DFI size that is greater than the UL grant DCI format 0_2 size (e.g., 922). In this respect, the downlink feedback information frame structure 910 may be truncated to remove one or more bits from the downlink feedback information frame structure 910. In some aspects, these removed bits may be considered unimportant or unused, depending on implementation. In various aspects, the bits that are removed for truncation may be located within the bitmap field of the HARQ-ACK portion of the downlink feedback information frame structure 910. As illustrated in FIG. 9, X MSB bits in the HARQ-ACK bitmap field (e.g., 912) may be truncated to ensure the DFI size of the downlink feedback information frame structure 910 is equivalent to the UL grant DCI format 0_2 size (e.g., 922). In some aspects, the truncated bits may correspond to respective HARQ processes.

Also in FIG. 9, a downlink feedback information frame structure 920 includes a DFI size that corresponds to the UL grant DCI format 0_2 size (e.g., 922) after truncation. In some aspects, the order of the bitmap to HARQ process index mapping is such that HARQ process indices are mapped in ascending order from MSB to LSB of the HARQ-ACK bitmap field after truncation (e.g., 930). In other aspects, the order of the bitmap field to HARQ-ACK process index mapping is such that configured HARQ process indices are mapped in ascending order from MSB to LSB of the HARQ-ACK bitmap field after truncation (e.g., 940). In some aspects, if the number of bits within the HARQ-ACK bitmap field after truncation is greater than the number of configured HARQ processes, each of the remaining bits within the HARQ-ACK bitmap field is set to zero. In some aspects, the order of the bitmap field 1030 may be applied for CG transmissions.

Figure 10:
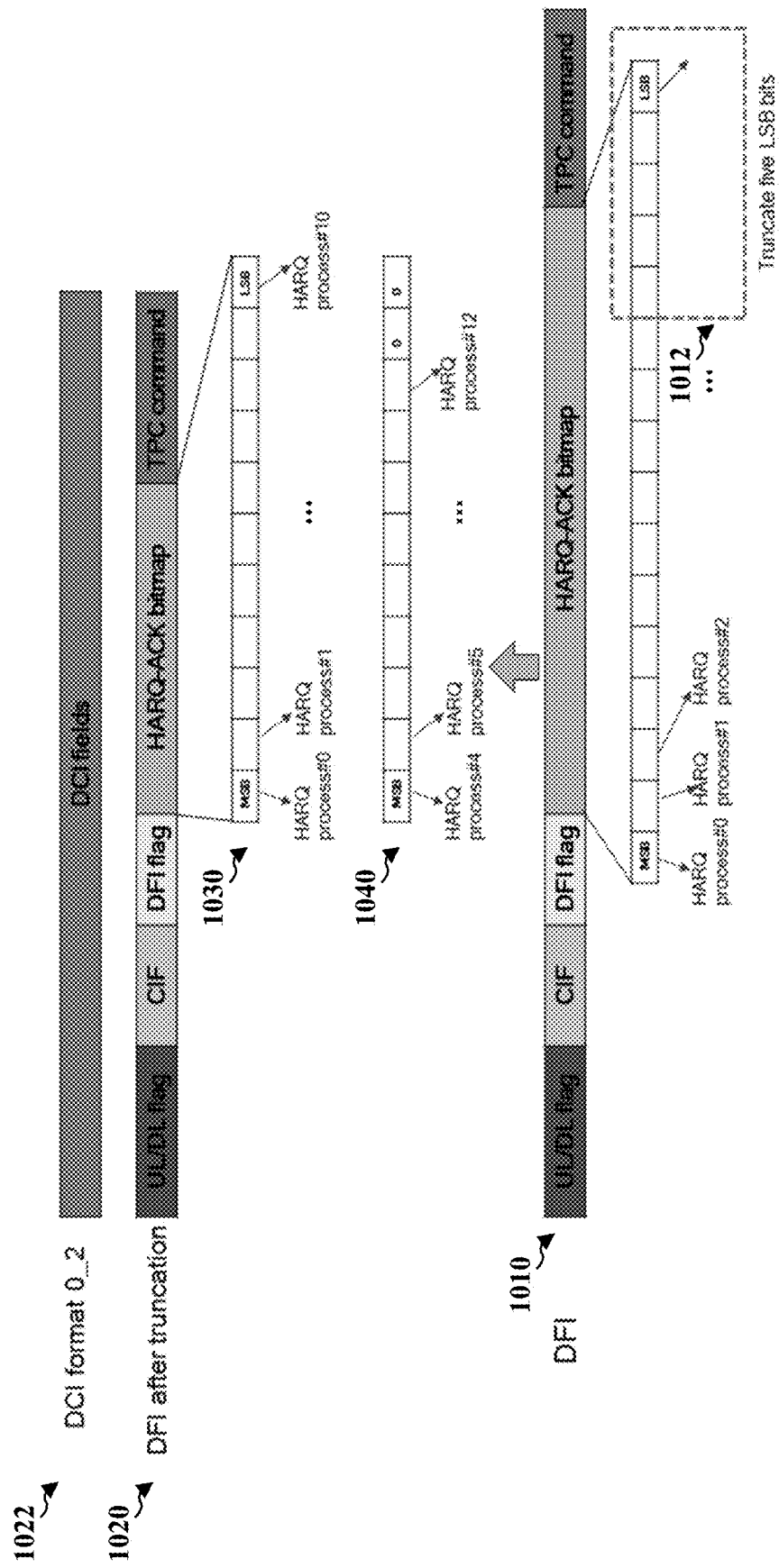
FIG. 10 is a diagram illustrating another example of downlink feedback information frame structure modification for corresponding to a downlink control information format 0_2 frame structure in accordance with some aspects of the present disclosure.

FIG. 10 is a diagram illustrating another example of downlink feedback information frame structure modification for corresponding to a downlink control information format 0_2 frame structure in accordance with some aspects of the present disclosure. In FIG. 10, a downlink feedback information frame structure 1010 includes DFI content in the DCI format 0_2 frame structure. The downlink feedback information frame structure 1010 has a DFI size that is greater than the UL grant DCI format 0_2 size (e.g., 1022). In this respect, the downlink feedback information frame structure 1010 may be truncated to remove one or more bits from the downlink feedback information frame structure 1010. In some aspects, these removed bits may be considered unimportant or unused, depending on implementation. In various aspects, the bits that are removed for truncation may be located within the bitmap field of the HARQ-ACK portion of the downlink feedback information frame structure 1010. As illustrated in FIG. 10, X LSB bits in the HARQ-ACK bitmap field (e.g., 1012) may be truncated to ensure the DFI size of the downlink feedback information frame structure 1010 is equivalent to the UL grant DCI format 0_2 size (e.g., 1022). In some aspects, the truncated bits may correspond to respective HARQ processes.

Also in FIG. 10, a downlink feedback information frame structure 1020 includes a DFI size that corresponds to the UL grant DCI format 0_2 size (e.g., 1022) after truncation. In some aspects, the order of the bitmap to HARQ process index mapping is such that HARQ process indices are mapped in ascending order from MSB to LSB of the HARQ-ACK bitmap field after truncation (e.g., 1030). In other aspects, the order of the bitmap field to HARQ-ACK process index mapping is such that configured HARQ process indices are mapped in ascending order from MSB to LSB of the HARQ-ACK bitmap field after truncation (e.g., 1040). In some aspects, if the number of bits within the HARQ-ACK bitmap field after truncation is greater than the number of configured HARQ processes, each of the remaining bits within the HARQ-ACK bitmap field is set to zero. In some aspects, the order of the bitmap field 1030 may be applied for CG transmissions.

In some implementations, for a UE that is configured to monitor for downlink control information having either a DCI format 0_1 frame structure or a DCI format 0_2 frame structure, the DFI content may be included with both the DCI format 0_1 frame structure and the DCI format 0_2 frame structure. In this regard, the UE may blindly decode each DCI to determine whether the DCI indicates the DFI or another purpose. In other implementations, for a UE that is configured to monitor for downlink control information having either the DCI format 0_1 frame structure or the DCI format 0_2 frame structure, the DFI content may be included exclusively with the DCI format 0_2 frame structure. In this regard, the 1-bit DFI flag may be excluded from the downlink control information with the DCI format 0_1 frame structure.

Figure 11:
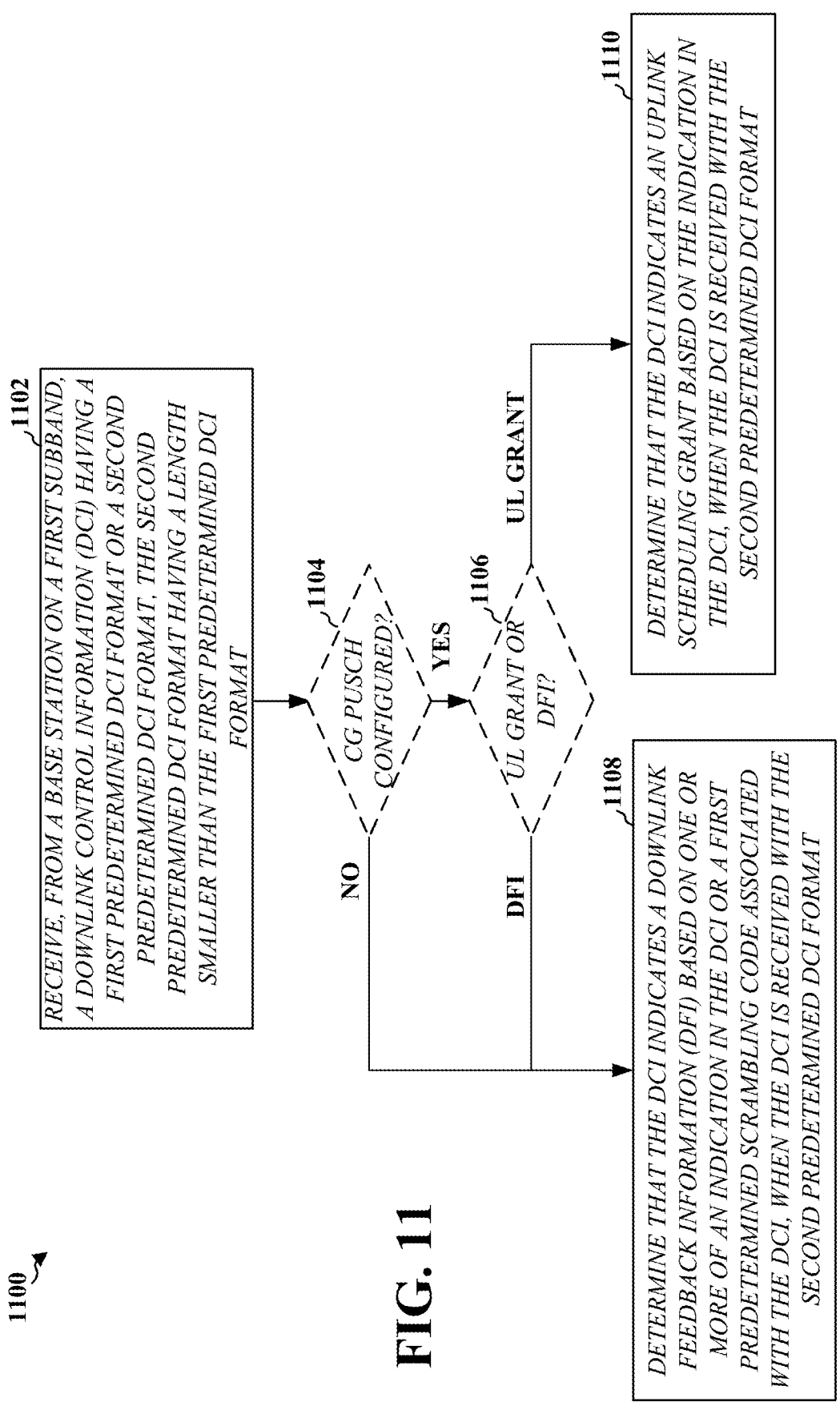
FIG. 11 is a flowchart illustrating a process of wireless communication that supports reception of downlink feedback information using a downlink control information format 0_2 frame structure in accordance with some aspects of the present disclosure.

FIG. 11 is a flowchart 1100 illustrating a process of wireless communication that supports transmission of downlink feedback information using downlink control information format 0_2 in accordance with some aspects of the present disclosure. The process may be performed by a UE (e.g., UE 104, 350, the apparatus 1202, the processing system 1314, which may include the memory 360 and which may be the entire UE 350 or a component of the UE 350, such as the TX processor 368, the RX processor 356, and/or the controller/processor 359). Optional aspects are illustrated in dashed lines.

At 1102, the UE may receive, from a base station on a first subband, a DCI having a first predetermined DCI format or a second predetermined DCI format. In some aspects, the first predetermined DCI format includes a DCI format 0_1 frame structure and the second predetermined DCI format includes a DCI format 0_2 frame structure. In some aspects, the second predetermined DCI format has a length that is smaller than the first predetermined DCI format. In some aspects, the DCI may be received via a first PDCCH of a plurality of PDCCHs multiplexed in time or frequency on the first subband. For example, 1102 may be performed by decoding component 1208 of FIG. 12 through reception component 1204 of FIG. 12.

At 1104, the UE may determine whether type 1 and/or type 2 CG PUSCH is configured. For example, 1104 may be performed by determination component 1210 of FIG. 12. If the UE determines that the type 1 and/or type 2 CG PUSCH is configured, the process proceeds to 1106. Otherwise, the process proceeds to 1108.

At 1106, the UE may determine whether the first PDCCH with the DCI format 0_2 frame structure indicates activation/deactivation of a CG transmission (or uplink scheduling grant) or the DFI. For example, 1106 may be performed by the determination component 1210 of FIG. 12. If the UE determines that the first PDCCH with the DCI format 0_2 frame structure indicates activation/deactivation of a CG transmission (or the uplink scheduling grant), the process proceeds to 1110. Otherwise, the process proceeds to 1108 when the UE determines that the first PDCCH with the DCI format 0_2 frame structure indicates the DFI.

At 1108, the UE may determine that the DCI indicates DFI based on one or more of an indication in the DCI or a first predetermined scrambling code associated with the DCI, when the DCI is received with the second predetermined DCI format. For example, 1108 may be performed by the determination component 1210 of FIG. 12. In some aspects, the first predetermined scrambling code may include a configured scheduling radio network temporary identifier. In other aspects, the first predetermined scrambling code may include a modulation coding scheme cell radio network temporary identifier. In still other aspects, the first predetermined scrambling code may include a downlink feedback information radio network temporary identifier. In various aspects, the indication in the DCI corresponds to a location in the DFI. In some aspects, the indication in the DCI includes a DFI flag that indicates a first value corresponding to activation/deactivation of a configured grant (CG) transmission or an uplink scheduling grant, or a second value corresponding to a CG-DFI.

At 1110, the UE may determine that the DCI indicates activation/deactivation of a CG transmission (or the uplink scheduling grant), when the DCI is received with the second predetermined DCI format. For example, 1108 may be performed by the determination component 1210 of FIG. 12. In some aspects, the UE may decode at least a portion of a CRC attachment in the DCI using the DFI-RNTI to determine that the DCI indicates the DFI. In this regard, usage of the DFI-RNTI infers indication of the DFI within the DCI format 0_2 frame structure. In other aspects, the CRC attachment includes a first portion that is encoded with the first predetermined scrambling code and a second portion that is encoded with a second predetermined scrambling code. For example, the first predetermined scrambling code may include a configured scheduling radio network temporary identifier and the second predetermined scrambling code may include a downlink feedback information radio network temporary identifier. In this regard, usage of the DFI-RNTI for decoding the second portion of the CRC attachment may infer indication of the DFI within the DCI format 0_2 frame structure.

Figure 12:
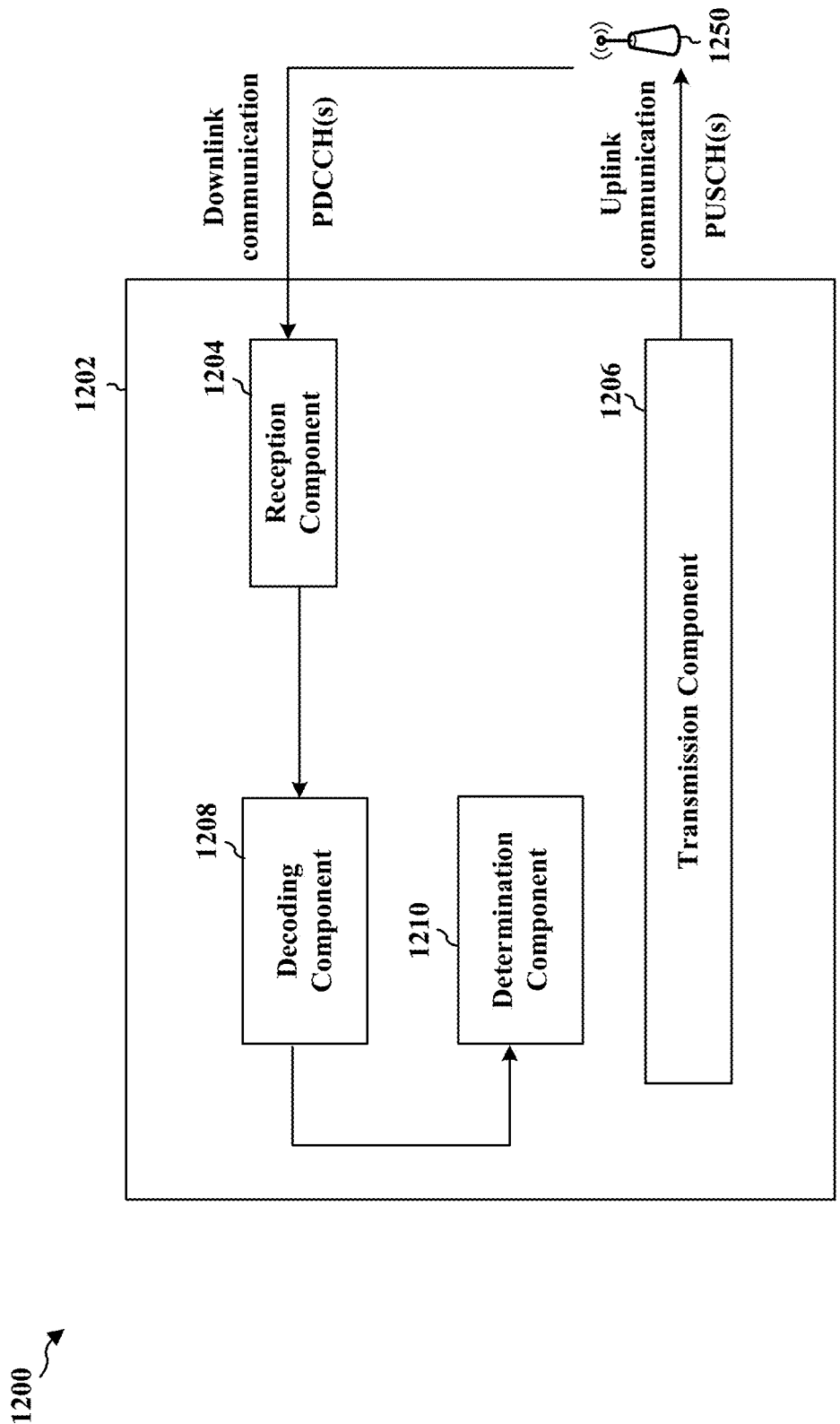
FIG. 12 is a conceptual data flow diagram illustrating the data flow between different components in an example apparatus in accordance with some aspects of the present disclosure.

FIG. 12 is a conceptual data flow diagram 1200 illustrating the data flow between different means/components in an example apparatus 1202. The apparatus 1202 may be a UE or a component of a UE (e.g., such as UE 104, 350). The apparatus 1202 may include a reception component 1204, a transmission component 1206, a decoding component 1208, and a determination component 1210.

The reception component 1204 may be configured to receive signals and/or other information from other devices including, e.g., base station 1250. The signals/information received by the reception component 1204 may be provided to one or more components of the apparatus 1202 for further processing and use in performing various operations in accordance with the methods discussed supra including the process of flowchart 1100. Thus, via the reception component 1204, the apparatus 1202 and/or one or more components therein receive signals and/or other information (e.g., such as data for the apparatus 1202, downlink control information, downlink feedback information and/or other control signaling) from the base station 1250 as discussed supra and also discussed more specifically infra.

In some implementations, the decoding component 1208 may be configured to decode (e.g., via the reception component 1204 from the base station 1250) a DCI having a first predetermined DCI format or a second predetermined DCI format, e.g., as described in connection with block 1106 of FIG. 11. In some aspects, the first predetermined DCI format includes a DCI format 0_1 frame structure and the second predetermined DCI format includes a DCI format 0_2 frame structure. In some aspects, the second predetermined DCI format has a length that is smaller than the first predetermined DCI format. In some aspects, the DCI may be received via a first PDCCH of a plurality of PDCCHs multiplexed in time or frequency on the first subband. In some aspects, the decoding component 1208 may decode at least a portion of the CRC attachment using the CS-RNTI. In some aspects, the decoding component 1208 may decode at least a portion of the CRC attachment using the MCS-C-RNTI. In some aspects, the decoding component 1208 may decode at least a portion of the CRC attachment using the DFI-RNTI. In some aspects, the decoding component 1208 may decode a first portion of the CRC attachment using the CS-RNTI and a second portion of the CRC attachment using the DFI-RNTI.

The determination component 1210 may be configured to determine whether a type 1 and/or type 2 CG PUSCH is configured, e.g., as described in connection with block 1104 of FIG. 11. In some aspects, the determination component 1210 may determine whether the first PDCCH with the DCI format 0_2 frame structure indicates activation/deactivation of a CG transmission or the DFI using the indication in the DCI when the type 1 and/or type 2 CG PUSCH is configured, e.g., as described in connection with block 1106 of FIG. 11.

The transmission component 1206 may be configured to transmit various messages to one or more external devices, e.g., including the base station 1250, in accordance with the methods disclosed herein. The messages/signals to be transmitted may be generated by one or more other components as discussed above, or the messages/signals to be transmitted may be generated by the transmission component 1206 under the direction/control of the one or more other components discussed supra. Thus, in various configurations, via the transmission component 1206, the apparatus 1202 and/or one or more components therein transmit signals and/or other information (e.g., such as uplink communication and/or other signals) to external devices such as the base station 1250.

The apparatus 1202 may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
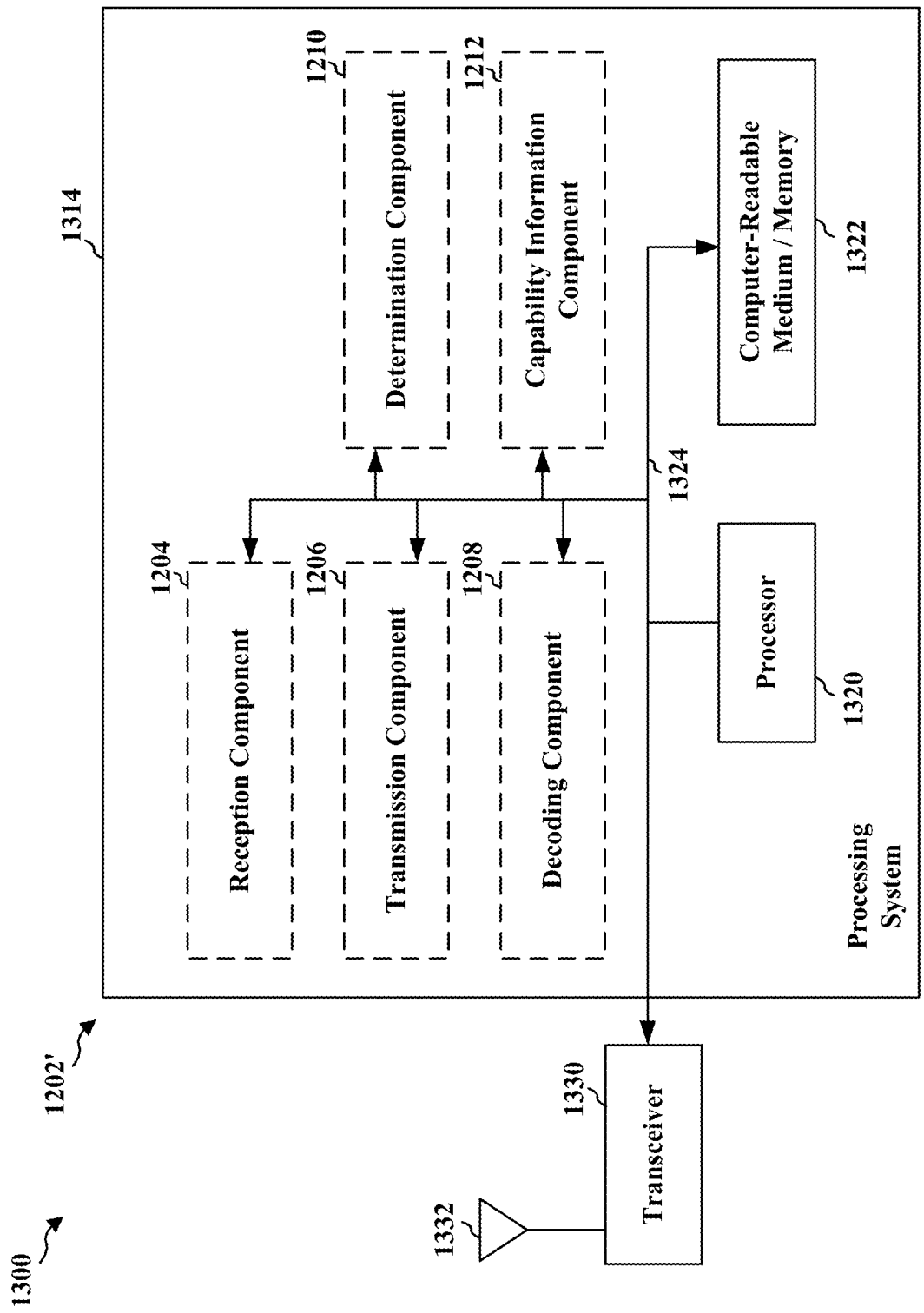
FIG. 13 is a diagram illustrating an example of a hardware implementation for an apparatus employing a processing system in accordance with some aspects of the present disclosure.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1322. The bus 1324 may also link various other circuits such as timing sources, peripherals, voltage regulators, and power management circuits, which are well known in the art, and therefore, will not be described any further.

The processing system 1314 may be coupled to a transceiver 1330. The transceiver 1330 is coupled to one or more antennas 1332. The transceiver 1330 provides a means for communicating with various other apparatus over a transmission medium. The transceiver 1330 receives a signal from the one or more antennas 1332, extracts information from the received signal, and provides the extracted information to the processing system 1314, specifically the reception component 1204. In addition, the transceiver 1330 receives information from the processing system 1314, specifically the transmission component 1216, and based on the received information, generates a signal to be applied to the one or more antennas 1332. The processing system 1314 includes a processor 1320 coupled to a computer-readable medium/memory 1322. The processor 1320 is responsible for general processing, including the execution of software stored on the computer-readable medium/memory 1322. The software, when executed by the processor 1320, causes the processing system 1314 to perform the various functions described supra for any particular apparatus. The computer-readable medium/memory 1322 may also be used for storing data that is manipulated by the processor 1320 when executing software. The processing system 1314 further includes at least one of the components 1204, 1206, 1208, 1210. The components may be software components running in the processor 1320, resident/stored in the computer-readable medium/memory 1322, one or more hardware components coupled to the processor 1320, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' is a UE for wireless communication including means for receiving, from a base station on a first subband, a DCI having a first predetermined DCI format or a second predetermined DCI format, the second predetermined DCI format having a length smaller than the first predetermined DCI format. The apparatus also includes means for determining that the DCI indicates a DFI based on one or more of an indication in the DCI or a first predetermined scrambling code associated with the DCI, when the DCI is received with the second predetermined DCI format.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
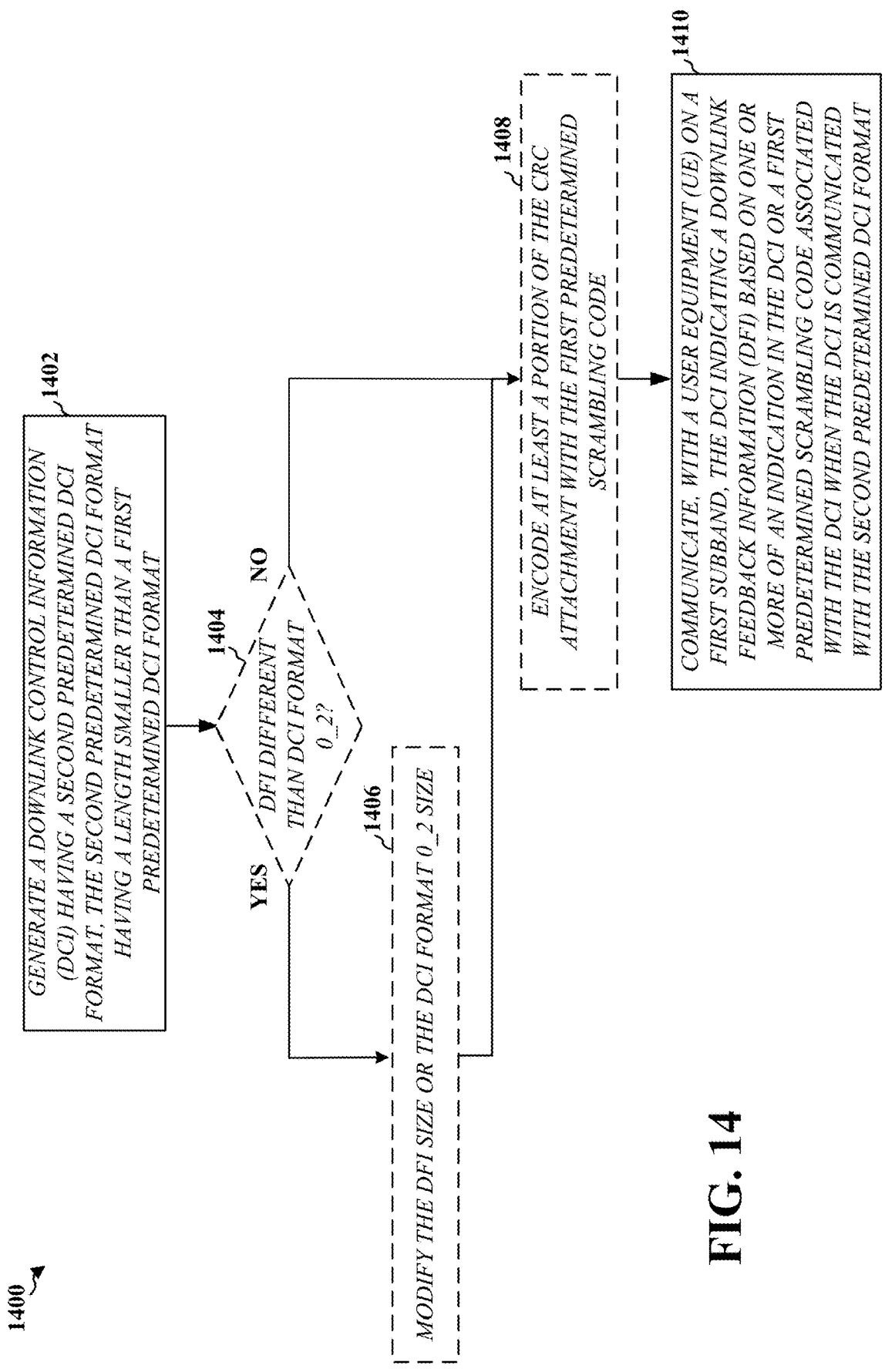
FIG. 14 is a flowchart illustrating a process of wireless communication that supports transmission of downlink feedback information using a downlink control information format 0_2 frame structure in accordance with some aspects of the present disclosure.

FIG. 14 is a flowchart 1400 of an example method of wireless communication that supports transmission of downlink feedback information using downlink control information format 0_2 in accordance with aspects presented herein. The method may be performed by a base station (e.g., base station 102, 180, 310, the apparatus 1502, the processing system 1614, which may include the memory 376 and which may be the entire base station 310 or a component of the base station 310, such as the TX processor 316, the RX processor 370, and/or the controller/processor 375). Optional aspects are illustrated in dashed lines.

At 1402, the BS may generate a DCI having a first predetermined DCI format or a second predetermined DCI format. In some aspects, the second predetermined DCI format has a length smaller than the first predetermined DCI format. For example, 1402 may be performed by generation component 1508 of FIG. 15. In the context of FIGS. 1 and 3, for example, the BS 102/180/310 may generate the DCI having the first predetermined DCI format or the second predetermined DCI format.

At 1404, the BS may determine whether the DFI size is different than the DCI format 0_2 size. If the BS determines that the DFI size is different than the DCI format 0_2 size, the process proceeds to 1406. Otherwise, the process proceeds to 1408. In the context of FIGS. 1 and 3, for example, the BS 102/180/310 may determine whether the DFI size is different than the DCI format 0_2 size.

At 1406, the BS may determine whether a first length of the DFI is less than a second length of the DCI format 0_2 frame structure. For example, 1406 may be performed by determination component 1510 with coordination with modify component 1512 of FIG. 15. In the context of FIGS. 1 and 3, for example, the BS 102/180/310 may determine whether the first length of the DFI is less than the second length of the DCI format 0_2 frame structure. In some aspects, the BS may modify the DFI or the DCI format 0_2 frame structure based on the determining. In one or more implementations, the BS may modify the first length of the DFI by appending zeroes to the DFI until the first length of the DFI is equivalent to the second length of the DCI format 0_2 frame structure, when the first length of the DFI is less than the second length of the DCI format 0_2 frame structure. In one or more implementations, the BS may configure the second length of the DCI format 0_2 frame structure to correspond to the first length of the DFI by appending zero-padding bits at a tail-end of the DCI format 0_2 frame structure, when the first length of the DFI is not less (or greater) than the second length of the DCI format 0_2 frame structure. In one or more implementations, the BS may configure the second length of the DCI format 0_2 frame structure to correspond to the first length of the DFI by truncating one or more MSBs of a bitmap field in the DFI, when the first length of the DFI is not less than the second length of the DCI format 0_2 frame structure. In one or more implementations, the BS may configure the bitmap field in the DFI by mapping HARQ process indices in ascending order from a MSB to a LSB of the bitmap field after truncation. In one or more implementations, the BS may configure the bitmap field in the DFI by mapping configured HARQ processes in ascending order from a MSB to a LSB of the bitmap field after truncation. In some aspects, the BS may determine whether a number of bits of the bitmap field after truncation is greater than a number of configured HARQ processes, and may configure a number of remaining bits in the bitmap field with zeroes when the number of bits of the bitmap field after truncation is greater than the number of configured HARQ processes. In other implementations, the BS may configure the second length of the DCI format 0_2 frame structure to correspond to the first length of the DFI by truncating one or more LSBs of a bitmap field in the DFI, when the first length of the DFI is not less than the second length of the DCI format 0_2 frame structure.

At 1408, the BS may encode at least a portion of the CRC attachment with the first predetermined scrambling code. For example, 1404 may be performed by encode component 1514 of FIG. 15. In the context of FIGS. 1 and 3, for example, the BS 102/180/310 may encode at least a portion of the CRC attachment with the first predetermined scrambling code. In some aspects, the BS may generate the DCI by encoding at least a portion of the CRC attachment with a first predetermined scrambling code. In an example, the BS may encode the at least a portion of the CRC attachment using CS-RNTI. In another example, the BS may encode the at least a portion of the CRC attachment using the MCS-C-RNTI. In another example, the BS may encode the at least a portion of the CRC attachment using the DFI-RNTI. In another example, the BS may encode a first portion of the CRC attachment using the CS-RNTI and a second portion of the CRC attachment using the DFI-RNTI.

At 1410, the BS may communicate, with a UE on a first subband, the DCI indicating a DFI based on one or more of an indication in the DCI or a first predetermined scrambling code associated with the DCI when the DCI is communicated with the second predetermined DCI format. For example, 1410 may be performed by configuration component 1516 of FIG. 15 through transmission component 1506 of FIG. 15. In the context of FIGS. 1 and 3, for example, the BS 102/180/310 may transmit the DCI indicating the DFI using the DCI format 0_2 frame structure.

Figure 15:
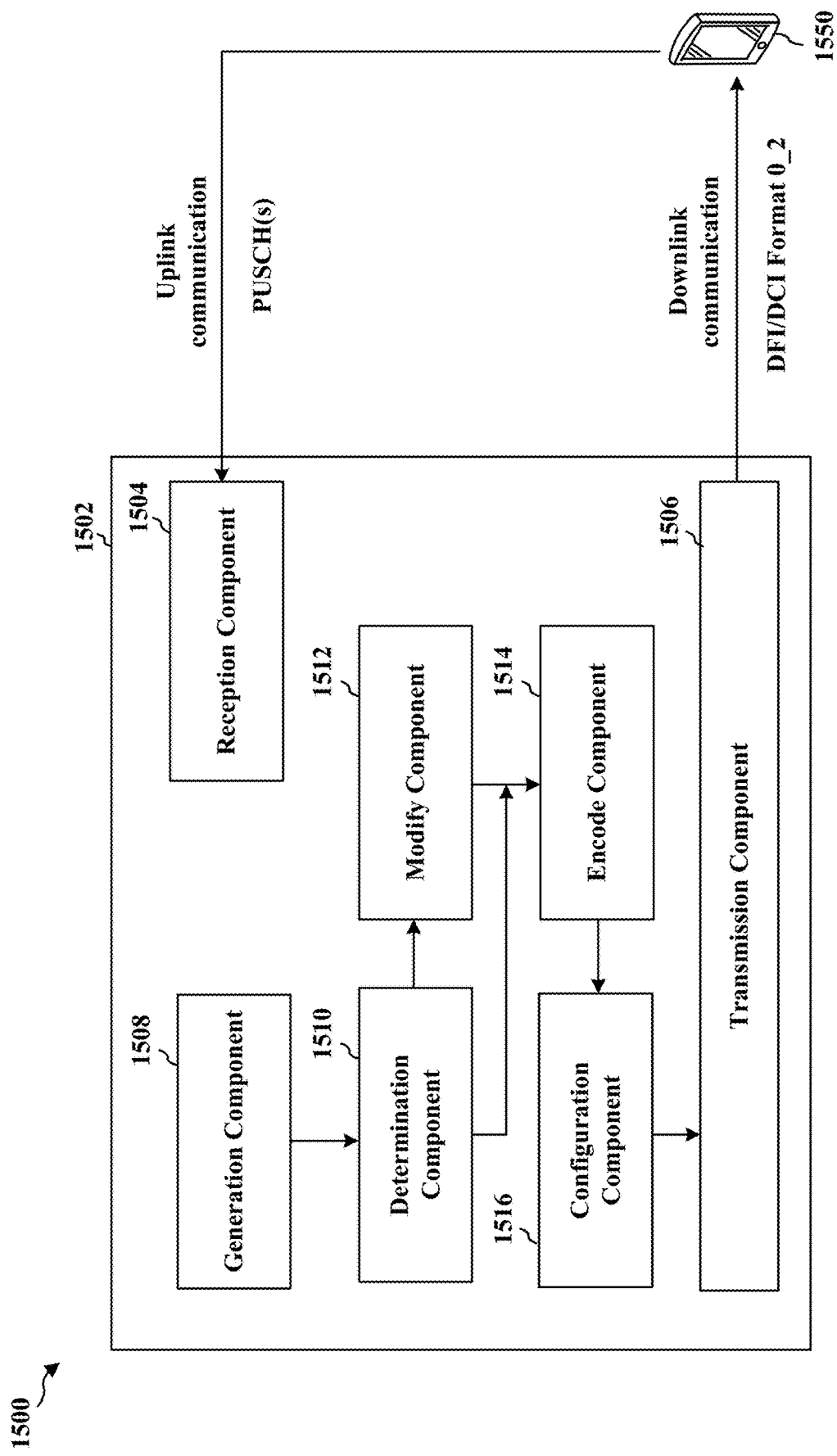
FIG. 15 is a conceptual data flow diagram illustrating the data flow between different components in an example apparatus in accordance with some aspects of the present disclosure.

FIG. 15 is a conceptual data flow diagram 1500 illustrating the data flow between different means/components in an example apparatus 1502. The apparatus may be a base station or a component of a base station (e.g., such as base station 102, 180, 310). For the purpose of discussion, we may consider that the apparatus 1502 may correspond to the base station 102 shown in FIG. 1. The apparatus 1502 may include a reception component 1504, a transmission component 1506, a generation component 1508, a determination component 1510, a modify component 1512, an encode component 1514 and a configuration component 1516.

The reception component 1504 may be configured to receive signals and/or other information from other devices including, e.g., UE 1550. The signals/information received by the reception component 1504 may be provided to one or more components of the apparatus 1502 for further processing and use in performing various operations in accordance with the methods discussed supra including the method of flowchart 1400. Thus, via the reception component 1504, the apparatus 1502 and/or one or more component therein receive signals and/or other information (e.g., such as uplink communication and/or other signals), from the UE 1550 as discussed supra and also discussed more specifically infra.

The generation component 1508 may generate a DCI having a first predetermined DCI format or a second predetermined DCI format, as described in connection with block 1402 of FIG. 14. In some aspects, the second predetermined DCI format has a length smaller than the first predetermined DCI format.

The determination component 1510 may determine whether the DFI size is different than the DCI format 0_2 size, as described in connection with block 1404 of FIG. 14. In some aspects, the determination component 1510 may determine whether a first length of the DFI is less than a second length of the DCI format 0_2 frame structure.

The modify component 1512 may modify the DFI or the DCI format 0_2 frame structure based on the determining. In one or more implementations, the modify component 1512 may modify the first length of the DFI by appending zeroes to the DFI until the first length of the DFI is equivalent to the second length of the DCI format 0_2 frame structure, when the first length of the DFI is less than the second length of the DCI format 0_2 frame structure.

The encode component 1514 may encode at least a portion of the CRC attachment with the first predetermined scrambling code. In some aspects, the generation component 1508, through coordination with the encode component 1514, may generate the DCI by encoding at least a portion of the CRC attachment with a first predetermined scrambling code. In an example, the encode component 1514 may encode the at least a portion of the CRC attachment using CS-RNTI. In another example, the encode component 1514 may encode the at least a portion of the CRC attachment using the MCS-C-RNTI. In another example, the encode component 1514 may encode the at least a portion of the CRC attachment using the DFI-RNTI. In another example, the encode component 1514 may encode a first portion of the CRC attachment using the CS-RNTI and a second portion of the CRC attachment using the DFI-RNTI.

The configuration component 1516, through coordination with the modify component 1512, may configure the second length of the DCI format 0_2 frame structure to correspond to the first length of the DFI by appending zero-padding bits at a tail-end of the DCI format 0_2 frame structure, when the first length of the DFI is not less (or greater) than the second length of the DCI format 0_2 frame structure. In one or more implementations, the configuration component 1516 may configure the second length of the DCI format 0_2 frame structure to correspond to the first length of the DFI by truncating one or more MSBs of a bitmap field in the DFI, when the first length of the DFI is not less than the second length of the DCI format 0_2 frame structure. In one or more implementations, the configuration component 1516 may configure the bitmap field in the DFI by mapping HARQ process indices in ascending order from a MSB to a LSB of the bitmap field after truncation. In one or more implementations, the configuration component 1516 may configure the bitmap field in the DFI by mapping configured HARQ processes in ascending order from a MSB to a LSB of the bitmap field after truncation. In some aspects, the configuration component 1516 may determine whether a number of bits of the bitmap field after truncation is greater than a number of configured HARQ processes, and may configure a number of remaining bits in the bitmap field with zeroes when the number of bits of the bitmap field after truncation is greater than the number of configured HARQ processes. In other implementations, the configuration component 1516 may configure the second length of the DCI format 0_2 frame structure to correspond to the first length of the DFI by truncating one or more LSBs of a bitmap field in the DFI, when the first length of the DFI is not less than the second length of the DCI format 0_2 frame structure.

The transmission component 1506 may be configured to transmit the above discussed information to one or more external devices, e.g., including the UE 1550, in accordance with the methods disclosed herein. The information to be transmitted may be included in messages/signals generated by one or more other components discussed above, or the messages/signals to be transmitted may be generated by the transmission component 1506 under the direction/control of the one or more other components discussed supra. Thus, in various configurations, via the transmission component 1506, the apparatus 1502 and/or one or more component therein transmit signals including the above discussed information (e.g., such as data for the apparatus 1502, downlink control information, downlink feedback information and/or other control signaling), to external devices such as the UE 1550. In some aspects, the transmission component 1506, through coordination with the configuration component 1516, may communicate, with a UE on a first subband, the DCI indicating a DFI based on one or more of an indication in the DCI or a first predetermined scrambling code associated with the DCI when the DCI is communicated with the second predetermined DCI format.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
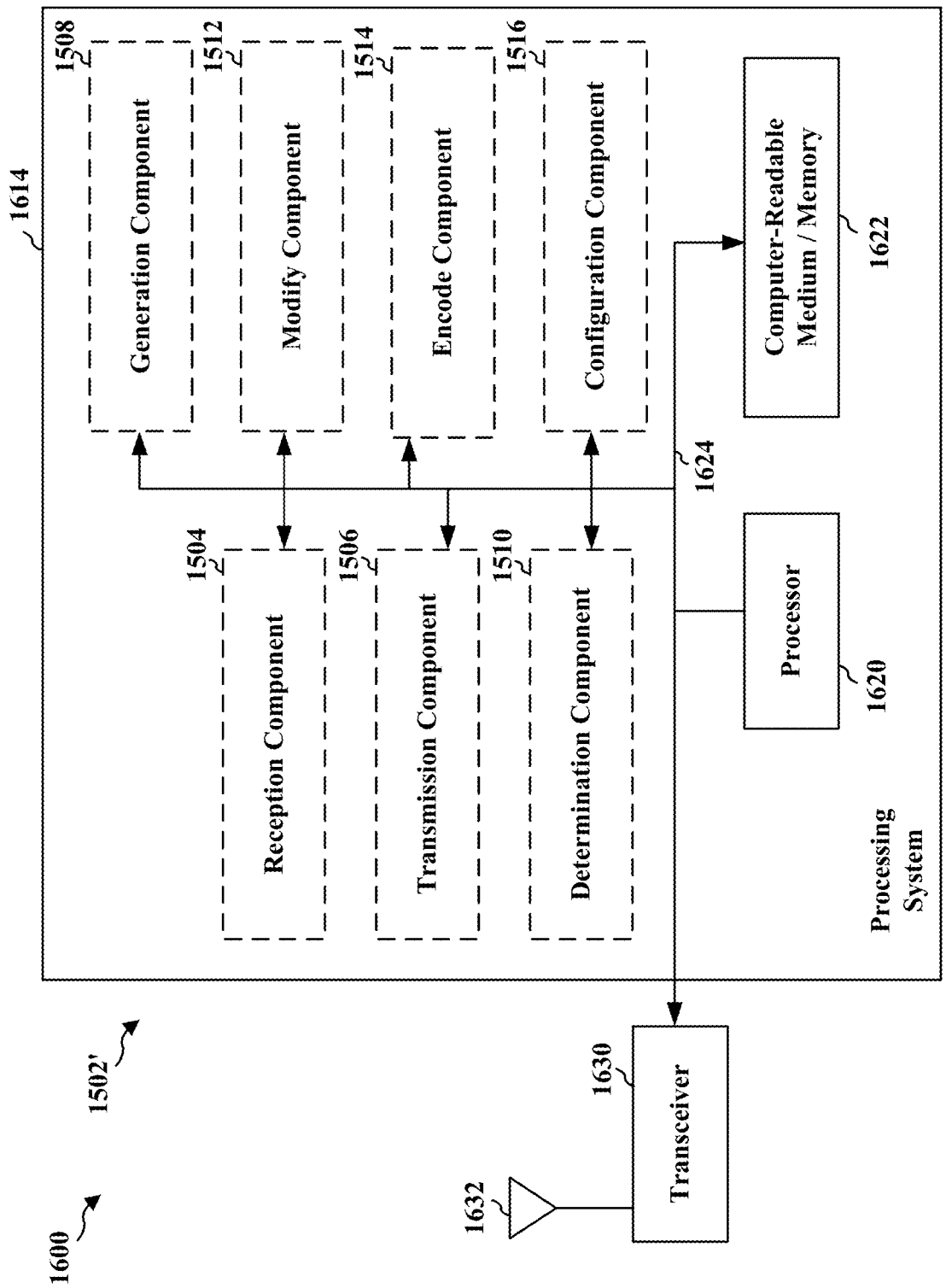
FIG. 16 is a diagram illustrating an example of a hardware implementation for an apparatus employing a processing system in accordance with some aspects of the present disclosure.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1620, the components 1504, 1506, 1508, 1510, 1512, 1514, 1516 and the computer-readable medium/memory 1622. The bus 1624 may also link various other circuits such as timing sources, peripherals, voltage regulators, and power management circuits, which are well known in the art, and therefore, will not be described any further.

The processing system 1614 may be coupled to a transceiver 1630. The transceiver 1630 is coupled to one or more antennas 1632. The transceiver 1630 provides a means for communicating with various other apparatus over a transmission medium. The transceiver 1630 receives a signal from the one or more antennas 1632, extracts information from the received signal, and provides the extracted information to the processing system 1614, specifically the reception component 1504. In addition, the transceiver 1630 receives information from the processing system 1614, specifically the transmission component 1506, and based on the received information, generates a signal to be applied to the one or more antennas 1632. The processing system 1614 includes a processor 1620 coupled to a computer-readable medium/memory 1622. The processor 1620 is responsible for general processing, including the execution of software stored on the computer-readable medium/memory 1622. The software, when executed by the processor 1620, causes the processing system 1614 to perform the various functions described supra for any particular apparatus. The computer-readable medium/memory 1622 may also be used for storing data that is manipulated by the processor 1620 when executing software. The processing system 1614 further includes at least one of the components 1504, 1506, 1508, 1510, 1512, 1514, 1516. The components may be software components running in the processor 1620, resident/stored in the computer readable medium/memory 1622, one or more hardware components coupled to the processor 1620, or some combination thereof. The processing system 1614 may be a component of the base station 310 and may include the memory 376 and/or at least one of the TX processor 316, the RX processor 370, and the controller/processor 375.

In one configuration, the apparatus 1502/1502' is a base station including means for generating a DCI having a first predetermined DCI format or a second predetermined DCI format, the second predetermined DCI format having a length smaller than the first predetermined DCI format. The apparatus also includes means for communicating, with a UE on a first subband, the DCI indicating a DFI based on one or more of an indication in the DCI or a first predetermined scrambling code associated with the DCI when the DCI is communicated with the second predetermined DCI format.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teachings described herein, without limitation.

Example 1 is a method of wireless communication at a UE, comprising: receiving, from a base station on a first subband, a downlink control information (DCI) having a first predetermined DCI format or a second predetermined DCI format, the second predetermined DCI format having a length smaller than the first predetermined DCI format; and determining that the DCI indicates a downlink feedback information (DFI) based on one or more of an indication in the DCI or a first predetermined scrambling code associated with the DCI, when the DCI is received with the second predetermined DCI format.

In Example 2, the method of Example 1 further includes that the first predetermined DCI format comprises a DCI format 0_1 frame structure and the second predetermined DCI format comprises a DCI format 0_2 frame structure.

In Example 3, the method of any of Example 1 or Example 2 further includes that the first subband comprises a plurality of physical downlink control channels (PDCCHs), multiplexed in time or frequency, the receiving the DCI comprises receiving, from the base station on the first subband, a first PDCCH of the plurality of PDCCHs, the first PDCCH comprising the DFI and a cyclic redundancy check (CRC) attachment, and at least a portion of the CRC attachment is encoded with the first predetermined scrambling code.

In Example 4, the method of any of Examples 1 to 3 further includes that the first predetermined scrambling code comprises a configured scheduling radio network temporary identifier (CS-RNTI).

In Example 5, the method of any of Examples 1 to 4 further includes determining whether a type 1 and/or type 2 configured grant (CG) physical uplink shared channel (PUSCH) is configured; and determining whether the first PDCCH with the DCI format 0_2 frame structure indicates activation/deactivation of a CG transmission or the DFI using the indication in the DCI when the type 1 and/or type 2 CG PUSCH is configured.

In Example 6, the method of any of Examples 1 to 5 further includes that the first predetermined scrambling code comprises a modulation coding scheme cell radio network temporary identifier (MCS-C-RNTI).

In Example 7, the method of any of Examples 1 to 6 further includes determining whether a type 1 and/or type 2 configured grant (CG) physical uplink shared channel (PUSCH) is configured; and determining whether the first PDCCH with the DCI format 0_2 frame structure indicates an uplink scheduling grant or the DFI using the indication in the DCI when the type 1 and/or type 2 CG PUSCH is configured.

In Example 8, the method of any of Examples 1 to 7 further includes that the first predetermined scrambling code comprises a downlink feedback information radio network temporary identifier (DFI-RNTI).

In Example 9, the method of any of Examples 1 to 8 further includes that the determining that the DCI indicates the DFI comprises decoding the at least a portion of the CRC attachment using the DFI-RNTI.

In Example 10, the method of any of Examples 1 to 9 further includes that the CRC attachment comprises a first portion that is encoded with the first predetermined scrambling code and a second portion that is encoded with a second predetermined scrambling code.

In Example 11, the method of any of Examples 1 to 10 further includes that the first predetermined scrambling code comprises a configured scheduling radio network temporary identifier (CS-RNTI) and the second predetermined scrambling code comprises a downlink feedback information radio network temporary identifier (DFI-RNTI).

In Example 12, the method of any of Examples 1 to 11 further includes that the DFI-RNTI in the second predetermined scrambling code has a first length and the CS-RNTI in the first predetermined scrambling code has a second length that is greater than the first length.

In Example 13, the method of any of Examples 1 to 12 further includes that the determining that the DCI indicates the DFI comprises decoding at least the second portion of the CRC attachment using the DFI-RNTI.

In Example 14, the method of any of Examples 1 to 13 further includes that the DFI has a first length that corresponds to a second length of an uplink scheduling grant with the DCI format 0_2 frame structure.

In Example 15, the method of any of Examples 1 to 14 further includes that the indication in the DCI corresponds to a location in the DFI, and the indication in the DCI comprises a DFI flag that indicates a first value corresponding to activation/deactivation of a configured grant (CG) transmission or an uplink scheduling grant or a second value corresponding to a CG-DFI.

In Example 16, the method of any of Examples 1 to 15 further includes that the UE is configured to monitor for the DCI having either the first predetermined DCI format or the second predetermined DCI format, and the DFI is included in the DCI with the first predetermined DCI format or the second predetermined DCI format, the determining comprises performing a blind decoding operation of the DCI with the first predetermined DCI format or the second predetermined DCI format to determine whether the DCI indicates the DFI.

In Example 17, the method of any of Examples 1 to 15 further includes that the UE is configured to monitor for the DCI having either the first predetermined DCI format or the second predetermined DCI format, the DFI is included in the DCI exclusively with the second predetermined DCI format, and the indication in the DCI that indicates whether the DFI is included in the DCI is excluded from the DCI with the first predetermined DCI format.

Example 18 is a device including one or more processors and one or more memories in electronic communication with the one or more processors storing instructions executable by the one or more processors to cause a system or an apparatus to implement a method as in any of Examples 1 to 17.

Example 19 is a system or apparatus including means for implementing a method or realizing an apparatus as in any of Examples 1 to 17.

Example 20 is a non-transitory computer-readable medium storing instructions executable by one or more processors to cause the one or more processors to implement a method as in any of Examples 1 to 17.

Example 21 is a method of wireless communication at a base station, comprising: generating a downlink control information (DCI) having a first predetermined DCI format or a second predetermined DCI format, the second predetermined DCI format having a length smaller than the first predetermined DCI format; and communicating, with a user equipment (UE) on a first subband, the DCI indicating a downlink feedback information (DFI) based on one or more of an indication in the DCI or a first predetermined scrambling code associated with the DCI when the DCI is communicated with the second predetermined DCI format.

In Example 22, the method of Example 21 further includes that the first predetermined DCI format comprises a DCI format 0_1 frame structure and the second predetermined DCI format comprises a DCI format 0_2 frame structure.

In Example 23, the method of any of Example 21 or Example 22 further includes that the first subband comprises a plurality of physical downlink control channels (PDCCHs), multiplexed in time or frequency, the communicating the DCI comprises transmitting, to the UE on the first subband, a first PDCCH of the plurality of PDCCHs, and the first PDCCH comprising the DFI and a cyclic redundancy check (CRC) attachment.

In Example 24, the method of any of Examples 21 to 23 further includes that the generating the DCI comprises: encoding at least a portion of the CRC attachment with the first predetermined scrambling code.

In Example 25, the method of any of Examples 21 to 24 further includes that the first predetermined scrambling code comprises a configured scheduling radio network temporary identifier (CS-RNTI).

In Example 26, the method of any of Examples 21 to 25 further includes that the first predetermined scrambling code comprises a modulation coding scheme cell radio network temporary identifier (MCS-C-RNTI).

In Example 27, the method of any of Examples 21 to 26 further includes that the first predetermined scrambling code comprises a downlink feedback information radio network temporary identifier (DFI-RNTI).

In Example 28, the method of any of Examples 21 to 27 further includes that the encoding the at least a portion of the CRC attachment comprises encoding at least a portion of the CRC attachment using the DFI-RNTI.

In Example 29, the method of any of Examples 21 to 28 further includes that the CRC attachment comprises a first portion that is encoded with the first predetermined scrambling code and a second portion that is encoded with a second predetermined scrambling code.

In Example 30, the method of any of Examples 21 to 29 further includes that the encoding the at least a portion of the CRC attachment comprises encoding at least the second portion of the CRC attachment using the DFI-RNTI.

In Example 31, the method of any of Examples 21 to 30 further includes that the first predetermined scrambling code comprises a configured scheduling radio network temporary identifier (CS-RNTI) and the second predetermined scrambling code comprises a downlink feedback information radio network temporary identifier (DFI-RNTI).

In Example 32, the method of any of Examples 21 to 31 further includes that the DFI-RNTI in the second predetermined scrambling code has a first length and the CS-RNTI in the first predetermined scrambling code has a second length that is greater than the first length.

In Example 33, the method of any of Examples 21 to 32 further includes that the indication in the DCI corresponds to a location in the DFI, and the indication in the DCI comprises a DFI flag that indicates a first value corresponding to activation/deactivation of a configured grant (CG) transmission or an uplink scheduling grant or a second value corresponding to a CG-DFI.

In Example 34, the method of any of Examples 21 to 33 further includes that the DFI has a first length that corresponds to a second length of an uplink scheduling grant with the DCI format 0_2 frame structure.

In Example 35, the method of any of Examples 21 to 34 further includes that the DFI has a first length that corresponds to a second length of the DCI format 0_2 frame structure.

In Example 36, the method of any of Examples 21 to 35 further includes determining whether the first length of the DFI is less than the second length of the DCI format 0_2 frame structure; and modifying the DFI or the DCI format 0_2 frame structure based on the determining.

In Example 37, the method of any of Examples 21 to 36 further includes that the modifying the DFI comprises: modifying the first length of the DFI by appending zeroes to the DFI until the first length of the DFI is equivalent to the second length of the DCI format 0_2 frame structure, when the first length of the DFI is less than the second length of the DCI format 0_2 frame structure.

In Example 38, the method of any of Examples 21 to 37 further includes that the modifying the DCI format 0_2 frame structure comprises: configuring the second length of the DCI format 0_2 frame structure to correspond to the first length of the DFI by appending zero-padding bits at a tail-end of the DCI format 0_2 frame structure, when the first length of the DFI is not less than the second length of the DCI format 0_2 frame structure.

In Example 39, the method of any of Examples 21 to 38 further includes that the modifying the DCI format 0_2 frame structure comprises: configuring the second length of the DCI format 0_2 frame structure to correspond to the first length of the DFI by truncating one or more most-significant bits (MSBs) of a bitmap field in the DFI, when the first length of the DFI is not less than the second length of the DCI format 0_2 frame structure.

In Example 40, the method of any of Examples 21 to 39 further includes configuring the bitmap field in the DFI by mapping hybrid automatic repeat request (HARQ) process indices in ascending order from a MSB to a least-significant bit (LSB) of the bitmap field after truncation.

In Example 41, the method of any of Examples 21 to 40 further includes configuring the bitmap field in the DFI by mapping configured hybrid automatic repeat request (HARQ) processes in ascending order from the MSB to least-significant (LSB) bits of the bitmap field after truncation.

In Example 42, the method of any of Examples 21 to 41 further includes determining whether a number of bits of the bitmap field after truncation is greater than a number of configured HARQ processes; and configuring a number of remaining bits in the bitmap field with zeroes when the number of bits of the bitmap field after truncation is greater than the number of configured HARQ processes.

In Example 43, the method of any of Examples 21 to 42 further includes that the modifying the DCI format 0_2 frame structure comprises: configuring the second length of the DCI format 0_2 frame structure to correspond to the first length of the DFI by truncating one or more least-significant bits (LSBs) of a bitmap field in the DFI, when the first length of the DFI is not less than the second length of the DCI format 0_2 frame structure.

In Example 44, the method of any of Examples 21 to 43 further includes configuring the bitmap field in the DFI by mapping hybrid automatic repeat request (HARQ) process indices in ascending order from a MSB to a least-significant bit (LSB) of the bitmap field after truncation.

In Example 45, the method of any of Examples 21 to 44 further includes configuring the bitmap field in the DFI by mapping configured hybrid automatic repeat request (HARQ) processes in ascending order from a most-significant bit (MSB) to a least-significant bit (LSB) of the bitmap field after truncation.

In Example 46, the method of any of Examples 21 to 45 further includes determining whether a number of bits of the bitmap field after truncation is greater than a number of configured HARQ processes; and configuring a number of remaining bits in the bitmap field with zeroes when the number of bits of the bitmap field after truncation is greater than the number of configured HARQ processes.

In Example 47, the method of any of Examples 19 to 46 further includes that the DCI comprises one or more of an uplink (UL)/downlink (DL) flag, a cross-carrier indicator field (CIF), a DFI flag, a hybrid automatic repeat request (HARD) acknowledgment (HARQ-ACK) bitmap, and a transmit power control (TPC) command, when the DCI indicates the DFI with the second predetermined DCI format.

Example 48 is a device including one or more processors and one or more memories in electronic communication with the one or more processors storing instructions executable by the one or more processors to cause a system or an apparatus to implement a method as in any of Examples 21 to 47.

Example 49 is a system or apparatus including means for implementing a method or realizing an apparatus as in any of Examples 21 to 47.

Example 50 is a non-transitory computer-readable medium storing instructions executable by one or more processors to cause the one or more processors to implement a method as in any of Examples 21 to 47.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:
    receiving, from a base station on a first subband, a downlink control information (DCI) having a first predetermined DCI format or a second predetermined DCI format, the second predetermined DCI format having a length smaller than the first predetermined DCI format; and
    determining that the DCI indicates a downlink feedback information (DFI) based on one or more of an indication in the DCI or a first predetermined scrambling code associated with the DCI, when the DCI is received with the second predetermined DCI format.

2. The method of claim 1, wherein the first predetermined DCI format comprises a DCI format 0_1 frame structure and the second predetermined DCI format comprises a DCI format 0_2 frame structure.

3. The method of claim 2, wherein:
    the first subband comprises a plurality of physical downlink control channels (PDCCHs), multiplexed in time or frequency,
    the receiving the DCI comprises receiving, from the base station on the first subband, a first PDCCH of the plurality of PDCCHs,
    the first PDCCH comprising the DFI and a cyclic redundancy check (CRC) attachment, and
    at least a portion of the CRC attachment is encoded with the first predetermined scrambling code.

4. The method of claim 3, wherein the first predetermined scrambling code comprises a configured scheduling radio network temporary identifier (CS-RNTI).

5. The method of claim 4, further comprising:
    determining whether one or more of a type 1 or type 2 configured grant (CG) physical uplink shared channel (PUSCH) is configured; and
    determining whether the first PDCCH with the DCI format 0_2 frame structure indicates activation or deactivation of a CG transmission or the DFI using the indication in the DCI when the one or more type 1 or type 2 CG PUSCH is configured.

6. The method of claim 3, wherein the first predetermined scrambling code comprises a modulation coding scheme cell radio network temporary identifier (MCS-C-RNTI).

7. The method of claim 6, further comprising:
    determining whether one or more of a type 1 or type 2 configured grant (CG) physical uplink shared channel (PUSCH) is configured; and
    determining whether the first PDCCH with the DCI format 0_2 frame structure indicates an uplink scheduling grant or the DFI using the indication in the DCI when the one or more of type 1 or type 2 CG PUSCH is configured.

8. The method of claim 3, wherein the first predetermined scrambling code comprises a downlink feedback information radio network temporary identifier (DFI-RNTI).

9. The method of claim 8, wherein the determining that the DCI indicates the DFI comprises decoding the at least a portion of the CRC attachment using the DFI-RNTI.

10. The method of claim 3, wherein the CRC attachment comprises a first portion that is encoded with the first predetermined scrambling code and a second portion that is encoded with a second predetermined scrambling code.

11. The method of claim 10, wherein the first predetermined scrambling code comprises a configured scheduling radio network temporary identifier (CS-RNTI) and the second predetermined scrambling code comprises a downlink feedback information radio network temporary identifier (DFI-RNTI).

12. The method of claim 11, wherein the DFI-RNTI in the second predetermined scrambling code has a first length and the CS-RNTI in the first predetermined scrambling code has a second length that is greater than the first length.

13. The method of claim 11, wherein the determining that the DCI indicates the DFI comprises decoding at least the second portion of the CRC attachment using the DFI-RNTI.

14. The method of claim 2, wherein the DFI has a first length that corresponds to a second length of an uplink scheduling grant with the DCI format 0_2 frame structure.

15. The method of claim 1, wherein:
    the indication in the DCI corresponds to a location in the DFI, and
    the indication in the DCI comprises a DFI flag that indicates a first value corresponding to activation or deactivation of a configured grant (CG) transmission or an uplink scheduling grant or a second value corresponding to a CG-DFI.

16. The method of claim 1, wherein:
    the UE is configured to monitor for the DCI having either the first predetermined DCI format or the second predetermined DCI format, and
    the DFI is included in the DCI with the first predetermined DCI format or the second predetermined DCI format,
    the determining comprises performing a blind decoding operation of the DCI with the first predetermined DCI format or the second predetermined DCI format to determine whether the DCI indicates the DFI.

17. The method of claim 1, wherein:
    the UE is configured to monitor for the DCI having either the first predetermined DCI format or the second predetermined DCI format,
    the DFI is included in the DCI exclusively with the second predetermined DCI format, and
    the indication in the DCI that indicates whether the DFI is included in the DCI is excluded from the DCI with the first predetermined DCI format.

18. An apparatus for wireless communication at a user equipment (UE), comprising: a memory; and
    at least one processor coupled to the memory and configured to:
    receive, from a base station on a first subband, a downlink control information (DCI) having a first predetermined DCI format or a second predetermined DCI format, the second predetermined DCI format having a length smaller than the first predetermined DCI format; and
    determine that the DCI indicates a downlink feedback information (DFI) based on one or more of an indication in the DCI or a first predetermined scrambling code associated with the DCI, when the DCI is received with the second predetermined DCI format.

19. A method of wireless communication at a base station, the method comprising: generating a downlink control information (DCI) having a first predetermined DCI format or a second predetermined DCI format, the second predetermined DCI format having a length smaller than the first predetermined DCI format; and
    communicating, with a user equipment (UE) on a first subband, the DCI indicating a downlink feedback information (DFI) based on one or more of an indication in the DCI or a first predetermined scrambling code associated with the DCI when the DCI is communicated with the second predetermined DCI format.

20. The method of claim 19, wherein the first predetermined DCI format comprises a DCI format 0_1 frame structure and the second predetermined DCI format comprises a DCI format 0_2 frame structure.

21. The method of claim 20, wherein:
the first subband comprises a plurality of physical downlink control channels (PDCCHs), multiplexed in time or frequency,
the communicating the DCI comprises transmitting, to the UE on the first subband, a first PDCCH of the plurality of PDCCHs, and
the first PDCCH comprising the DFI and a cyclic redundancy check (CRC) attachment.

22. The method of claim 21, wherein the generating the DCI comprises:
encoding at least a portion of the CRC attachment with the first predetermined scrambling code.

23. The method of claim 19, wherein:
the indication in the DCI corresponds to a location in the DFI, and
the indication in the DCI comprises a DFI flag that indicates a first value corresponding to activation or deactivation of a configured grant (CG) transmission or an uplink scheduling grant or a second value corresponding to a CG-DFI.

24. The method of claim 20, wherein the DFI has a first length that corresponds to a second length of an uplink scheduling grant with the DCI format 0_2 frame structure.

25. The method of claim 20, wherein the DFI has a first length that corresponds to a second length of the DCI format 0_2 frame structure.

26. The method of claim 25, further comprising:
determining whether the first length of the DFI is less than the second length of the DCI format 0_2 frame structure; and
modifying the DFI or the DCI format 0_2 frame structure based on the determining.

27. The method of claim 26, wherein the modifying the DFI comprises:
modifying the first length of the DFI by appending zeroes to the DFI until the first length of the DFI is equivalent to the second length of the DCI format 0_2 frame structure, when the first length of the DFI is less than the second length of the DCI format 0_2 frame structure.

28. The method of claim 26, wherein the modifying the DCI format 0_2 frame structure comprises:
configuring the second length of the DCI format 0_2 frame structure to correspond to the first length of the DFI by appending zero-padding bits at a tail-end of the DCI format 0_2 frame structure, when the first length of the DFI is not less than the second length of the DCI format 0_2 frame structure.

29. The method of claim 26, wherein the modifying the DCI format 0_2 frame structure comprises:
configuring the second length of the DCI format 0_2 frame structure to correspond to the first length of the DFI by truncating one or more most-significant bits (MSBs) of a bitmap field in the DFI, when the first length of the DFI is not less than the second length of the DCI format 0_2 frame structure.

30. The method of claim 26, wherein the modifying the DCI format 0_2 frame structure comprises:
configuring the second length of the DCI format 0_2 frame structure to correspond to the first length of the DFI by truncating one or more least-significant bits (LSBs) of a bitmap field in the DFI, when the first length of the DFI is not less than the second length of the DCI format 0_2 frame structure.

* * * * *